(12) United States Patent
Akcasu

(10) Patent No.: US 11,054,680 B1
(45) Date of Patent: Jul. 6, 2021

(54) ELECTRONICALLY CONFIGURABLE VARIABLE APERTURE AND GRATING FOR OPTICAL AND SPECTRAL APPLICATIONS

(71) Applicant: UltResFP, LLC, Austin, TX (US)

(72) Inventor: Osman Ersed Akcasu, San Diego, CA (US)

(73) Assignee: UltResFP, LLC, Austin, TX (US)

( * ) Notice: Subject to any disclaimer, the term of this patent is extended or adjusted under 35 U.S.C. 154(b) by 458 days.

(21) Appl. No.: 16/271,804

(22) Filed: Feb. 9, 2019

Related U.S. Application Data

(63) Continuation-in-part of application No. 16/057,677, filed on Aug. 7, 2018.

(51) Int. Cl.
| | | |
|---|---|---|
| *G02F 1/01* | (2006.01) | |
| *G02F 1/133* | (2006.01) | |
| *G02F 1/1343* | (2006.01) | |
| *G02F 1/137* | (2006.01) | |
| *G02F 1/29* | (2006.01) | |

(52) U.S. Cl.
CPC .......... *G02F 1/13306* (2013.01); *G02F 1/137* (2013.01); *G02F 1/13439* (2013.01); *G02F 1/134309* (2013.01); *G02F 1/292* (2013.01); *G02F 2201/122* (2013.01); *G02F 2203/22* (2013.01)

(58) Field of Classification Search
CPC .......... G02F 1/13306; G02F 1/134309; G02F 1/13439; G02F 1/137; G02F 1/292; G02F 2201/122; G02F 2203/22
See application file for complete search history.

(56) References Cited

U.S. PATENT DOCUMENTS

| | | | | |
|---|---|---|---|---|
| 2002/0024688 A1* | 2/2002 | Ogasawara | ....... | G02F 1/134309 |
| | | | | 359/16 |
| 2009/0015785 A1* | 1/2009 | Blum | ...................... | G02C 7/061 |
| | | | | 351/159.01 |
| 2009/0279050 A1* | 11/2009 | McGinn | .................. | G02C 7/061 |
| | | | | 351/159.47 |
| 2013/0002973 A1* | 1/2013 | Chen | ......................... | G02B 3/14 |
| | | | | 349/15 |
| 2016/0320677 A1* | 11/2016 | Tanabe | .............. | G02F 1/134309 |
| 2017/0293197 A1* | 10/2017 | Van Heugten | ............ | A61F 2/16 |
| 2018/0166489 A1* | 6/2018 | Sao | ........................... | G02B 3/00 |

\* cited by examiner

*Primary Examiner* — Hoan C Nguyen
(74) *Attorney, Agent, or Firm* — Law Office of Gerald Maliszewski; Gerald Maliszewski

(57) ABSTRACT

Provided are devices and methods capable of electronically controlling and varying aperture diameters or diffracting light. The method provides a solid-state device made up of a transparent bottom electrode (TBE), a layer of liquid crystal (LC) material overlying the TBE, and a field of selectively engageable transparent top electrodes (TTEs). Light incident to the TTEs is accepted and a voltage differential between one or more selected TTEs and the TBE. As a result, an optically transparent region is created in the LC material interposed between the selected TTEs and the TBE. Depending on the arrangement of the TTEs and their size respective to the wavelength of the incident light, the light is either transmitted through an aperture or diffracted.

30 Claims, 18 Drawing Sheets

ELECTRONICALLY CONFIGURABLE VARIABLE APERTURE AND GRATING FOR OPTICAL AND SPECTRAL APPLICATIONS

BACKGROUND OF THE INVENTION

1. Field of the Invention

This invention generally relates to the field of optics and, more particularly, to solid-state variable aperture and light diffraction devices.

2. Description of the Related Art

A pinhole camera is a simple camera without a lens but with a tiny aperture (pinhole), which in its simplest form is a light-proof box with a small hole in one side. Light from a scene passes through the aperture and projects an inverted image on the opposite side of the box, which is known as the camera obscura effect.

The basics of pinhole cameras, pinhole images, and camera obscura are a natural optical phenomenon and its discovery goes all the way back all to 500BC. This natural phenomenon can be found in Chinese Mozi writings (500BC) and Aristotelian Problems (300BC). In the golden scientific age of Islam, Ibn-al-Haytham (965-1040) of Cairo, known to the west as "Alhazen", "second Ptolemy", or as "the Physicist", scientist, philosopher, mathematician, astronomer, and widely considered as the father of theoretical physics and optics; used pinholes mostly to study the nature of light and watch sun eclipses. Giambattista dela Porta of Naples, (1535-1615) perfected the pinhole camera. This period also corresponds to the time of the wide use of glass lenses. In the 17$^{th}$ century camera obscura with a lens became a popular drawing aid. The photographic camera developed in the 19th century is basically camera obscura in a box.

The use of a "pin-hole" in the context of optics can be found in James Ferguson's 1764 book. The first known pinhole photography is found in 1856 book "The Stereoscope", written by Scottish physicist, mathematician, astronomer, inventor, and also known as "Johannes Kepler of Optics", David Brewster (1871-1868) described it as "a camera without lenses, only with pinhole". Sir William Crooks (1832-1919), British chemist, physicist pioneer of atomic physics with his invention of the cathode ray tube also known as the "Crooks Tube", was also among users of pinhole camera.

Pinhole photographs have a nearly infinite depth of field, and everything appears in focus [3, 4]. As there's no lens distortion, wide angle images remain absolutely rectilinear. However, exposure times are usually long, resulting in motion blur around moving objects and the absence of objects that move too fast.

Up to a certain point, the smaller the hole, the sharper the image, but the dimmer the projected image. Within limits, a smaller pinhole results in sharper image resolution because the projected circle of confusion at the image plane is practically the same size as the pinhole. An extremely small hole, however, can produce significant diffraction effects and a less clear image due to the wave properties of light. Additionally, vignetting occurs as the diameter of the hole approaches the thickness of the material in which it is formed, because the sides of the hole obstruct the light entering at anything other than 90 degrees. The best pinhole is perfectly round (since irregularities cause higher-order diffraction effects), and formed in an extremely thin piece of material. The depth of field is basically infinite, but optical blurring may occur. The infinite depth of field means that image blur depends not on object distance, but on other factors, such as the distance from the aperture to the film plane, the aperture size, the wavelength(s) of the light source, and motion of the subject.

Perhaps the most important optical property of a pinhole camera is that all objects, regardless of how close they are to the pinhole, are in focus. This property is a very difficult to realize in any camera system regardless of how much effort is put on the lens design. Lenses used for microphotography, or in other words for "close-up photography", are expensive, heavy, and large, and on top of that, they cannot focus on objects that range from 0 to infinite distances away from the lenses. Even with these flaws, conventional micro-photography lens may cost hundreds of dollars.

Having the ability to truly focus on objects from distances of 0 to infinite, opens up many applications for pinhole cameras. USPTO application [1] is a good example, which describes a fingerprint recognition system in a smartphone where the thickness of the system must be in the order of 5 millimeters (mm) or less.

Josef Petzval, (1807-1891) a Hungarian mathematician, physicist, and inventor, best known for his work in optics, is the first to attempt to formulate the method of calculating the optimal pinhole diameter in 1857 as a function of wavelength and focal depth [2]. The later work done by Lord Rayleigh in 1891 gives the more accurate formula which is widely used today treating the problem as a light diffraction problem from a pinhole. Focal depth $f_D$ in a pinhole is given by the Rayleigh formula as [2], $$d = 2\sqrt{f_D \cdot \lambda} \qquad (1)$$

where $\lambda$ is the wavelength of the light traversing the pinhole and $f_D$ is the focal length from the pinhole to the optical image sensor, viewed as the perpendicular distance from the pinhole plane where the sharpest image occurs. For visible light, the wavelength range $\lambda$ in nanometers [nm ($10^{-9}$ m)] is given by, $$380 \leq \lambda \leq 780 \text{ nm} \qquad (2)$$

Solving focal depth $f_D$ from (1) gives the quadratic relation gives, $$f_D = \frac{d^2}{4\lambda} \qquad (3)$$

FIGS. 1A and 1B illustrate the relationship between focal depth $f_D$ versus pinhole diameter din, respectively, linear and log-log scales. To be able to show the lower end of the wavelength in relation (3) clearly, FIG. 1B shows the function in log-log scale for 380, 550, and 780 nanometer (nm) wavelengths corresponding to different colors such as violet, blue, green, yellow, orange, and red. Using the log-log plot in FIG. 1B, it can easily see how a very thin pinhole camera can be built, which is able to fit in the thickness of a smartphone of 5 mm thickness, by selecting the right diameter for a desired focal depth, which has to be less than the smartphone thickness.

For the mass production of products, engineers like to use standard parts already available in the market, instead of designing the custom sub-systems from scratch. This principle also applies to camera systems. Standard off-the-shelf charge-coupled device (CCD) or complementary metaloxide-semiconductor (CMOS) imagers for smartphones currently in the market have micro-lenses in front of their imagers, and they are easily obtainable at a low cost [10, 11, 12]. Therefore, one is inclined to use the smartphone camera system already existing for the smartphone market, and put a proper diameter pinhole in front of it, at the optimal distance. The formulas (2) and (3) are approximate formulas assuming a zero thickness opaque material where the pinhole is formed, no refractive effects from the glass cover, and the use of the lenses already existing in the CCD/CMOS camera system, placed in between the pinhole and the CCD/CMOS imager. However, since various smartphones have different thicknesses and variations of these parts, there exists no one optimal pinhole diameter that works the best in all camera systems. To find the optimal pinhole diameter for a particular camera system under consideration requires trial-and-error experimentation, with hard to handle fixtures, and requires a large amount of time and effort in determining the best diameter for a given distance away from the camera lens.

U.S. application Ser. No. 16/057,677, filed Aug. 7, 2018, by Osman Ersed Akcasu, and entitled "Electronic Device and Method for Non-Contact Capacitive and Optical Pin Hole Fingerprint Detection" [1] describes a properly designed pinhole camera system that captures very high-resolution fingerprint images in a 5 mm thickness or less, which can fit in a smartphone. The resolution in this system is only limited by the CCD imager pixel size and Airy Disk diameter of the optical system, which is on the order of 3 by 3 micron ($\mu$ or $\mu$m) size. This is a quantum leap forward from the 50×50$\mu$ resolution of conventional smartphone camera systems, and provides a greater than 100× improvement in resolution over other methods currently available in the fingerprint recognition space [9]. The problem of finding the proper diameter pinhole to be placed in front of the CCD imaging camera system at the optimal distance away from it was solved experimentally. In this approach, several smartphone glasses with a range of pinhole diameters were built and used in determining the optimal pinhole diameter and its distance from a selected smart phone CCD camera system. The initial estimated range of pinhole diameters was calculated using Raleigh's formula (1) having a focal depth ($f_D$) of less than 5 mm, so that the optical fingerprint recognition system fit in a typical smartphone thickness. However, in one experiment using an exemplary smartphone, several pinhole diameters were tried before the optimal diameter was discovered. It would be advantageous if the aperture diameter for pinhole camera system could be easily varied.

Diffraction refers to various phenomena that occur when a wave encounters an obstacle or a slit. It is defined as the bending of waves around the corners of an obstacle or aperture into the region of geometrical shadow of the obstacle. In classical physics, the diffraction phenomenon is described as the interference of waves according to the Huygens-Fresnel principle that treats each point in the wave-front as a collection of individual spherical wavelets [5, 6, 7]. These characteristic behaviors are exhibited when a wave encounters an obstacle or a slit that is comparable in size to its wavelength. Diffraction can occur at all wavelengths of light.

While diffraction occurs whenever propagating waves encounter such changes, its effects are generally most pronounced for waves whose wavelength are roughly comparable to the dimensions of the diffracting object or slit. If the obstructing object provides multiple, closely spaced openings, a complex pattern of varying intensity can result. This is due to the addition, or interference, of different parts of a wave that travel to the observer by different paths, where different path lengths result in different phases. A diffraction grating is an optical component with a regular (periodic) pattern. The form of light diffracted by a grating depends on the structure of the elements and the number of elements present, but all gratings have intensity maxima at certain angles. Unfortunately, the pattern formed at a particular wavelength is limited by the dimensions grating slits, which cannot be easily changed. It would be advantageous if the periodic pattern of transparent slits and occlusion forming a diffraction grating could be easily varied depending on the desired interference pattern and incident wavelength of light.

SUMMARY OF THE INVENTION

Described herein are optical devices built in two different areas of application, based in part on the wavelength spectrum of interest. The first area is aperture applications is where the wavelength nature of the light doesn't manifest itself and geometric ray optics apply. Therefore, this range of applications covers photography, micro-photography, fingerprint detection, and microscopy, etc. The geometries of the aperture device; such as width (w), spacings (s), diameters (d), and focal lengths, as well as the overall geometries are larger than the largest wavelength, $\lambda_{MAX}$ of the wavelength spectrum $\lambda_{MIN} \leq \lambda \leq \lambda_{MAX}$ of typical interest. As an example, the visible light spectrum for humans is defined in the range of $380 \leq \lambda \leq 780$ nanometers (nm). Therefore, every geometry in the optics built for this range of applications is larger than 780 nanometers (nm). On the other hand, if the interest is in the near infra-red applications, where the spectrum is defined as $780 \leq \lambda \leq 2500$ nm, the geometries in the optics are larger than 2500 nm. Similarly, in the ultraviolet applications where the spectrum is defined as $190 \leq \lambda \leq 350$ nm, the physical geometries of the apparatus must be kept larger than 350 nm.

The second range of applications utilizes the wave nature of the light spectrum of interest, in diffraction gratings applications such as beam steering. The geometries used in these devices are in the range of wavelength spectrum, but larger than the $\lambda_{MIN}$. A general rule of thumb is that electromagnetic radiation can pass through holes or slits if the diameter of the hole or the width of the slit is larger than the wavelength. The rule applies to any reflective or transmissive diffractive device. This rule puts a bandwidth limit on any diffractive device. As an example, if a diffractive grating has slit width and occlusions of 0.5 microns (500 nm), it does not allow wavelengths shorter than 500 nm to be analyzed by diffractive methods. Thus, to perform spectroscopy in the visible light range, one needs another diffractive device geometry for these longer wavelengths.

Since the wavelength determines the geometry of a device, a device using electrically programmable optical geometry can perform its function in multiple wavelength applications, such as simple aperture control for cameras, to the pinhole camera applications like micro-photography, microscopy, and even all the way to the aperture sizes of wavelengths of the light where diffraction related applications can be performed. This brings a great flexibility and opens up a wide range of applications with ease and low price.

Accordingly, a method is provided for varying the size of an optical aperture. The method provides a solid-state aperture made up of a transparent bottom electrode (TBE), a layer of liquid crystal (LC) material overlying the TBE, and a field of selectively engageable transparent top electrodes (TTEs) concentrically aligned around an optically transparent aperture center and formed overlying the LC layer. The method accepts light incident to the TTEs and applies a voltage differential between one or more selected TTEs and the TBE. As a result, an optically transparent region is created in the LC material interposed between the selected TTEs and the TBE, and the light is transmitted through the aperture. As used herein, the term "light" refers to electromagnetic radiation. The aperture may be used in to transmit visible, ultraviolet (UV), and infrared (IR) wavelengths, but is not limited only this range of electromagnetic radiation.

The TTEs may be referenced in a direction outward from the aperture center. For example, TTE a1 may be concentrically aligned inside TTE a2. If a voltage differential is applied to TTE a1, an optically transparent region is created in the LC material with a cross-section d1 across the aperture center. If TTE a1 has the form of a ring, then d1 is a diameter that includes the width of the TTE ring and the optical center. When the voltage differential to TTEs a1 and a2, then the optically transparent region in the LC material has a cross-section d2 across the aperture center, where d2>d1.

Also provided is a method for variably diffracting light using a solid-state diffraction grating. The method provides a solid-state diffraction grating made up of a transparent conducting bottom electrode (TBE) with a front surface, a layer of LC material overlying the TBE front surface, and a field of selectively engageable serially aligned transparent top electrodes (TTEs) formed overlying the LC layer. The method accepts light incident to the TTEs and applies a voltage differential between one or more selected TTEs and the TBE. An optically transparent region is created in the LC material interposed between the selected TTEs and the TBE, and a pattern of diffracted light is transmitted through the diffraction grating.

For example, if a voltage differential is applied to a first set of TTEs, a first field of periodically aligned optically transparent regions is created having a width (t1), along with periodically aligned occlusions having a width (o1) between adjacent transparent regions, resulting in a first diffraction pattern. If a voltage differential is applied to a second set of TTEs, a second field of periodically aligned optically transparent regions is created, with having a width (t2), different than width t1, along with periodically aligned occlusions having a width (o2) between adjacent transparent regions, different than o1, resulting in a second diffraction pattern, different from the first diffraction pattern. The diffraction grating is also capable of controlled beam steering.

Additional details of the above-described methods, as well as solid-state aperture and diffraction grating devices are presented below.

DETAILED DESCRIPTION

As noted in the Background Section above, the trial-and-error process of finding the optimal pinhole diameter for different camera systems is both costly and time consuming. This trial-and-error experimentation exposes the need for an easier way of adjusting a pinhole diameter "on demand", which in turn suggests many new potential applications for a non-mechanical variable aperture. Liquid crystal display (LCD) technology is used in the solid-state aperture device described herein to electronically control the pinhole diameter. With this capability, the charge-coupled device (CCD) or complementary metal-oxide-semiconductor (CMOS) camera system, typically used for fingerprint recognition in a smartphone, can be used like the pupil of a human eye, which adjusts its diameter with the light intensity, and it can be used for many other applications like in micro-photography and even microscopy in a smartphone.

Instead of having a large number of preformed pinhole diameters, or an array of pinholes, built on, for example, the Gorilla glass cover of a smartphone, the single pinhole diameter is electronically controlled in the solid-state aperture device described herein. Thus, determining the appropriate pinhole diameter for the any kind of smartphone optical system is easily achievable. If properly calculated, the variable diameter pinhole makes any experimental procedure much easier, and also open the way for a wide variety of applications possible involving electronically controlled aperture camera applications.

Figure 1A:
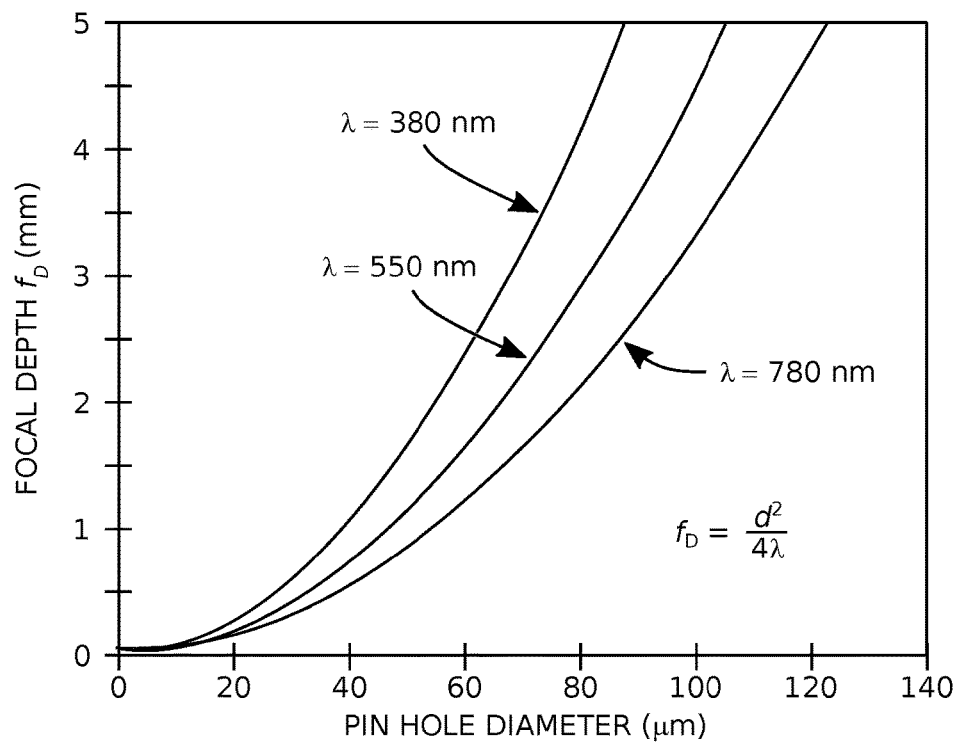
FIGS. 1A and 1B illustrate the relationship between focal depth $f_D$ versus pinhole diameter din, respectively, linear and log-log scales.
Figure 1B:
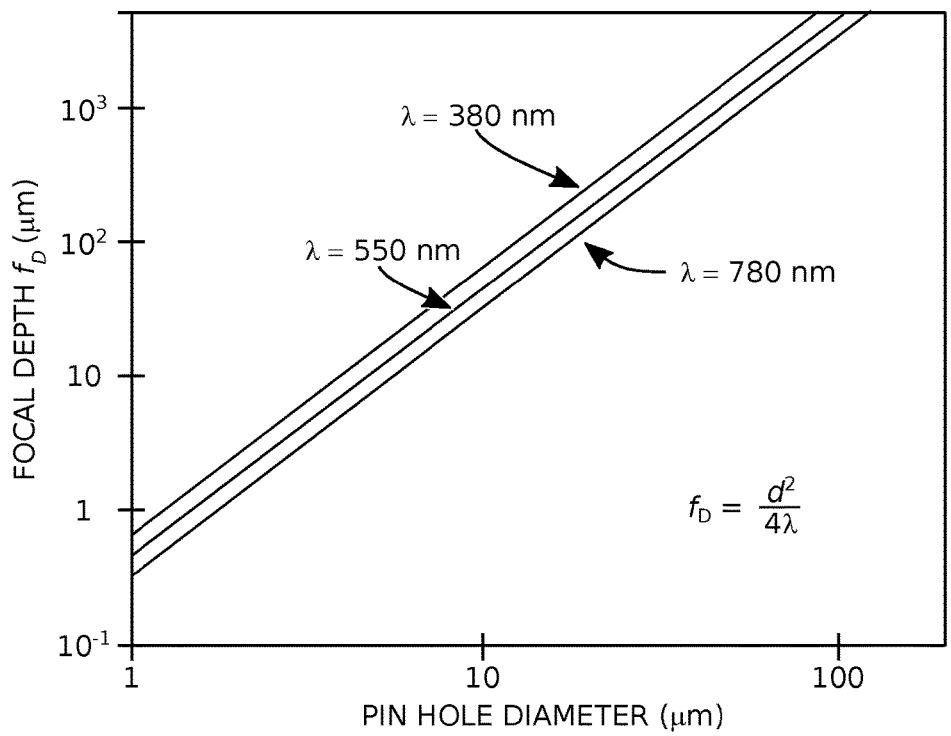
Figure 2:
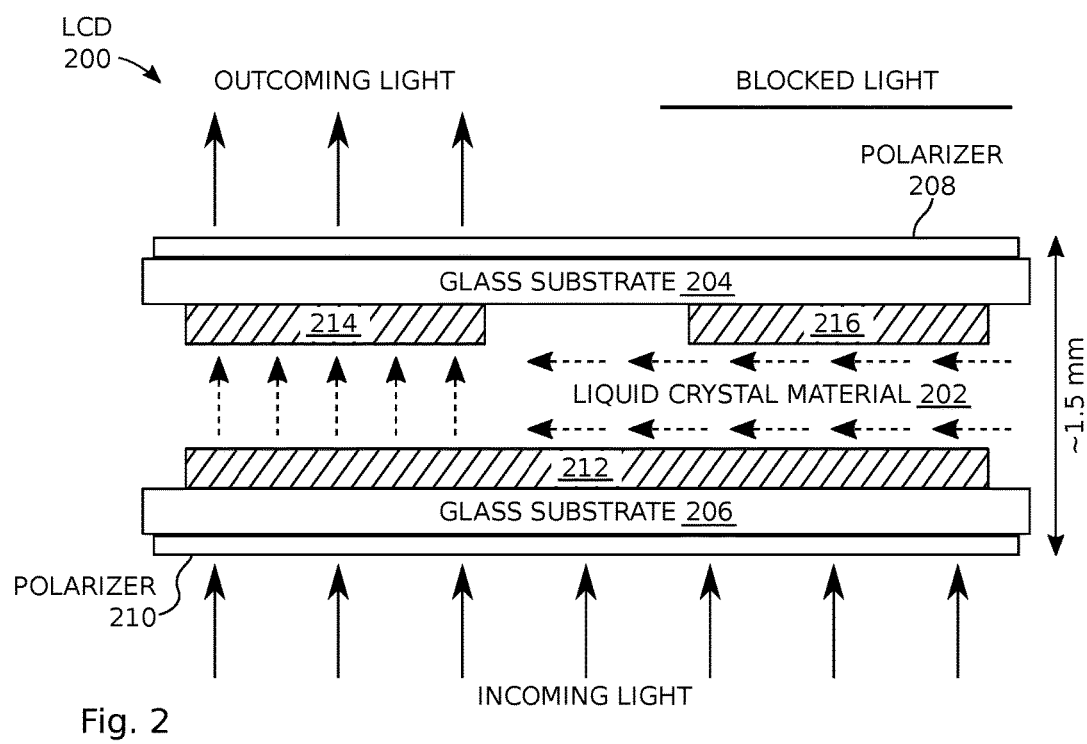
FIG. 2 is a partial cross-sectional view of an exemplary LCD structure (prior art).

FIG. 2 is a partial cross-sectional view of an exemplary LCD structure (prior art) [8]. A common transparent LCD 200 uses a two-layer indium tin oxide (ITO) structure which forms the transparent conductive electrodes. The transparent electrodes are also covered with a very thin layer of molecular alignment layers which can greatly affect the device characteristics and quality of the display. The liquid crystals are rod shaped long molecules which can be oriented with electric field, heat, or a magnetic field. One of several different kinds of liquid crystal 202 (e.g., Smectic, Nematic, or Cholesteric) is sandwiched between the transparent conductive layers enclosed by a glass (204 and 206) or a transparent enclosure. The most widely used type of LCD is the Twisted Nematic (TN), in which the liquid crystal is twisted through 90° between the electrodes. The structure has front and back polarizers, 208 and 210, for achieving electrically controllable transparency with any desired geometrical patterned transparent electrode layout. The entire thickness of a common LCD today is in the order of 1 to 2 mm thickness including front and back polarizers [8]. The electrodes are connected to external terminals for external electronic access. The first transparent conductor layer 212 can be a ground plane. The second transparent conductor layers 214 and 216 can be patterned. When a voltage is applied between the second layer of transparent electrode (e.g., 214) and the ground-plane 212, an electric field is created between the transparent electrodes. When an electric field is applied to the liquid crystal it changes its optical properties such as its refractive index optical rotary power, double refraction, dichroism, or light scattering caused by aligned liquid crystals. In short, the liquid crystal becomes either transparent or opaque.

Aperture

Figure 3A:
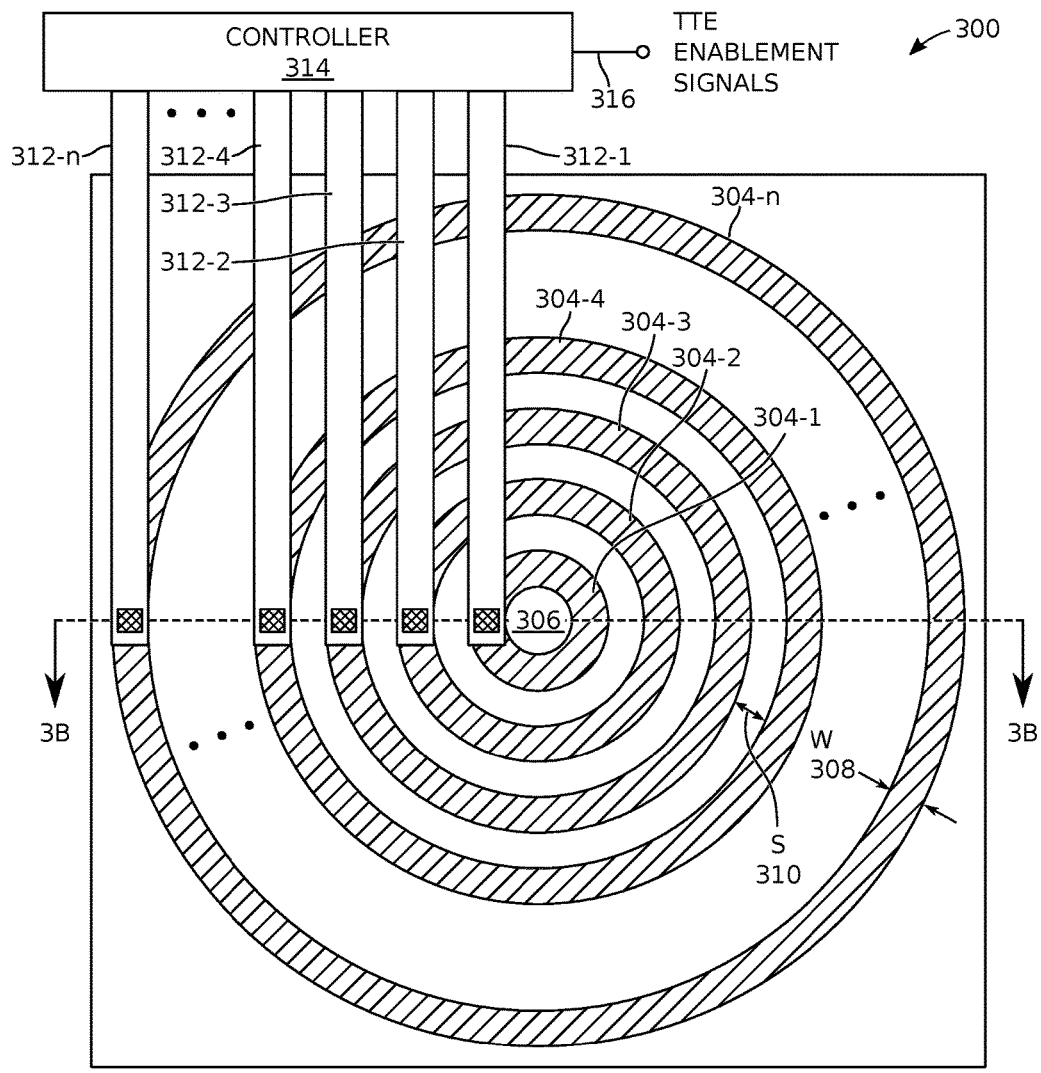
FIGS. 3A and 3B are, respectively, plan and partial cross-sectional views of a solid-state variable aperture.
Figure 3B:
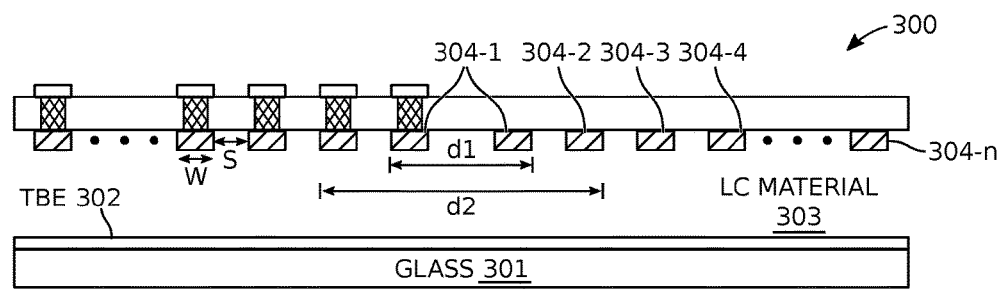

FIGS. 3A and 3B are, respectively, plan and partial cross-sectional views of a solid-state variable aperture. The solid-state variable aperture 300 comprises a transparent bottom electrode (TBE) 302 having a front surface, with the TBE formed on a bottom glass layer 301. Typically, the TBE 302 acts as a ground-plane or reference voltage. A layer of liquid crystal (LC) material 303 overlies the front surface of the TBE 302. A field of selectively engageable transparent top electrodes (TTEs), 304-1 through 304-$n$, are concentrically aligned around an optically transparent aperture center 306 and formed overlying the LC layer 303. As used herein, the term "optically transparent" is understood to be non-occluding to at least to at least some wavelengths of light, i.e., the wavelengths of light pertinent to the particular application for which the aperture is being used. As used herein, the term "light" refers to electromagnetic radiation. The aperture may be used in to transmit visible, ultraviolet (UV), and infrared (IR) wavelengths, but is not limited only this range of electromagnetic radiation. Not shown in the interest of simplicity are this alignment layers interposed between the TTEs and LC material 303, and between the TBE 302 and the LC material. In some aspects not explicitly shown, one or more polarizer layers may be used, such as shown in FIG. 2.

In the example depicted n=5, but generally the aperture is not limited to any particular number of TTEs. Typically, the TTEs and TBE are made from ITO, but potentially they can be made from other types of transparent conductive oxides (TCOs), as would be known by those with skill in the art. As noted above in the explanation of FIG. 2, interposing LC material 303 becomes optically transparent in response to a voltage differential applied between selected TTEs and the TBE 302.

The application of the voltage differential to TTE 304-1 creates an optically transparent region in the LC material 303 with a cross-section d1 across the aperture center. The application of the voltage differential to TTEs 304-1 and 304-2 creates an optically transparent region in the LC material 303 with a cross-section d2 around the aperture center, where d2>d1. As shown, the TTEs are concentrically aligned rings, in which case cross-sections d1 and d2 may be more accurately understood to be diameters. Although the TTEs are depicted as circular rings, in other aspect the TTEs may be formed in the shape of rectangles, lines, ovals, other concentric geometric shapes for the purpose light diffraction or other special optical effects.

Figure 4A:
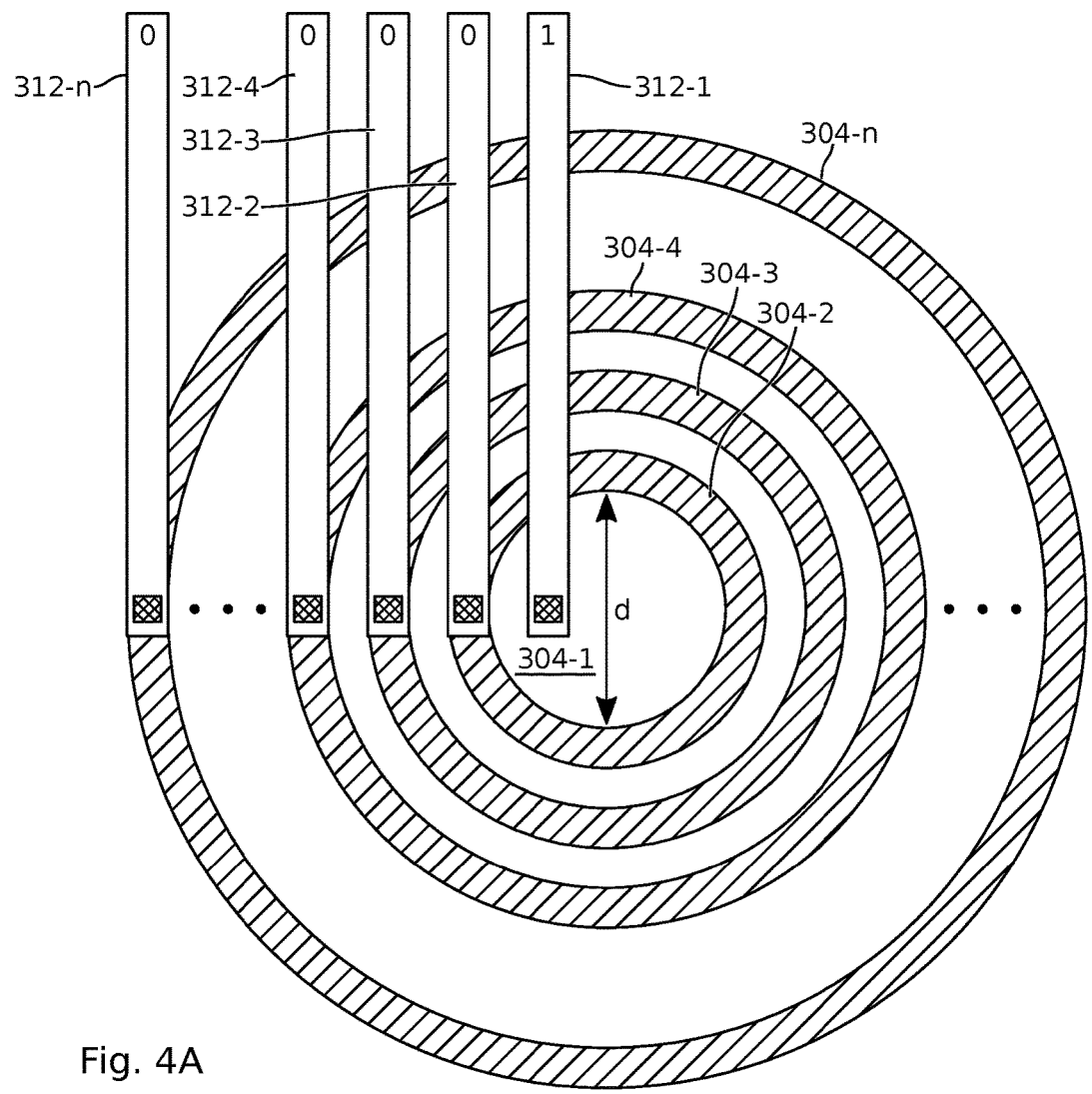
FIGS. 4A through 4D are plan views graphically showing the control of aperture dimensions in response to applying a voltage potential to the TTE rings.

For visible light applications, the TTEs may have a width (w) 308 and are separated from adjacent TTEs by a space (s) 310, where w≥about 1000 nanometers (nm) and s is less than about 380 nm. That is, d1 need not be equal to w, and any difference between these two values affects the degree and resolution of light transmission. The space (s) between TTEs may potentially occlude incident light since it is not covered by a TTE. Although not depicted as such, the TTE width (w) is typically much greater the spacing (s), e.g., w≥4s. Depending upon factors such as the applied voltage differential, and thus the electric field in the LC material, the LC material adjacent to enabled TTEs may likewise be subject to the neighboring electric field in the LC material underlying the enabled TTE. Thus, the occluding effect of spacing s may be even further limited. Likewise, the cross-sectional dimension of the aperture center 306 is significantly smaller than the width of TTE 304-1 so as to optically insignificant, or as above, the occluding effect of the LC material underlying the aperture center may be further limited due to the electric field in the LC material underlying TTE 304-1. In one aspect, such as shown in FIG. 4A, the aperture center is part of the interior most TTE 304-1. Thus, in that example, the first TTE takes the shape of a circle, as opposed to a ring.

Although the TTE widths (w) 308 are depicted as uniform in size, it should be understood that each TTE may have a unique width. Likewise, although the width of spacings (s) 310 is depicted as uniform, it should be understood that each particular spacing between TTEs may have a unique width.

Generally, for any application where interference or the wave property of the light or electromagnetic radiation is not desired, and the spectrum of interest wavelengths are between $\lambda_{MIN}$ and $\lambda_{MAX}$, the space (s) between the TTEs should be less than or equal to $\lambda_{MIN}$ and the practical TTE widths should be w>>s (e.g., w≥4s). On the other hand, for spectroscopy/grating applications, discussed in detail below, the generation of interference patterns on an image plane is desired, to measure the distances between the intensity maximums and minimums as well as their angle of diffraction with respect to a transparent or reflective grating as given in well-known diffraction equations. Therefore, the periodic grating structure should be in the order of wavelengths, but not smaller than the $\lambda_{MIN}$. Since ITO is likely to be the most practical transparent electrode material, the limits on the wand s are basically set by the etching limits of ITO and somewhat the thickness of the LC.

As shown, transparent conductive voltage supply traces 312-1 through 312-$n$ are respectively connected to the TTEs 304-1 through 304-$n$. A controller 314 has an input on line 316 to accept TTE enablement signals and outputs connected to transparent conductive voltage supply traces 312-1 through 3012-$n$, to selectively enable TTEs in response to the enablement signals. Although not explicitly shown, in some aspects to controller may be connected to selectively apply voltages changes to the TBE, as described in the explanation of FIG. 5.

FIGS. 4A through 4D are plan views graphically showing the control of aperture dimensions in response to applying a voltage potential to the TTE rings. The numeral "1" in the drawings represents an enabling TTE voltage, which generates electric fields between the top and bottom transparent electrodes in the liquid crystal, and makes the LC material transparent by aligning liquid crystals along y axes. The numeral "0" represents a non-enabling or off voltage. Practically, the 0 state correspond to 0V and 1 state is on the order of 3-10V.

Applying a voltage to the concentric rings with respect to the ground-plane, an electrical field is produced between the rings and the ground-plane where the liquid crystal is sandwiched. This electrical field orients the liquid crystals along z axes (looking into the sheet), which makes the two-electrode capacitor structure transparent to light.

Figure 5:
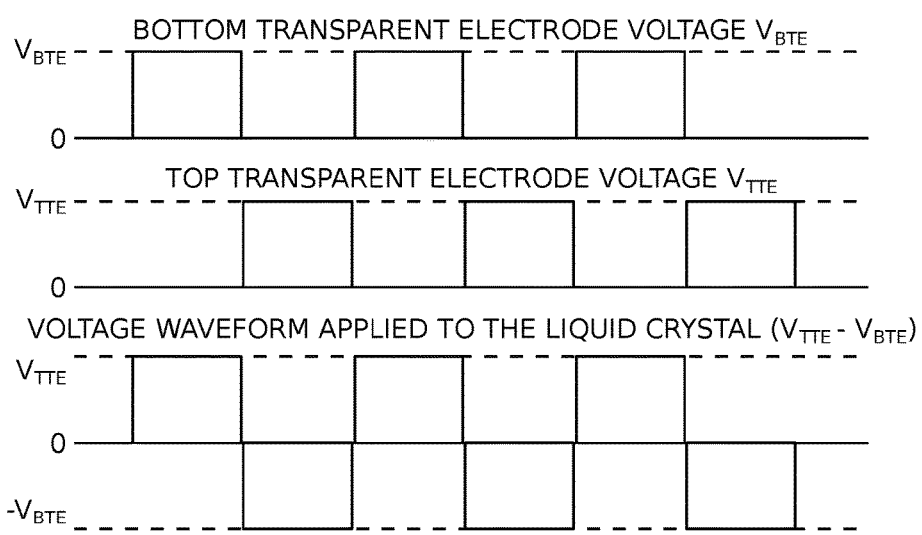
FIG. 5 is a graph depicting pulsed voltages that give 0V average voltage between TTE and TBE.

FIG. 5 is a graph depicting pulsed voltages that give 0V average voltage between TTE and TBE. TTEs are turned "off" by shifting the pulsed waveform 1800. This is known as "static drive" and applying what is effectively an AC voltage avoids the deterioration of the liquid crystal due to direct current operation.

The pinhole diameter or aperture diameter is controlled by applying the proper voltages to each TTE, thus controlling the optical properties like focal depth $f_D$ and fingerprint capture area $d_{VIEW}$ registered on the optical sensor as explained in USPTO application [1].

Typically, LCD aperture control for a camera operating in the visible range has spacings (s) between the TTEs on the order of 380 nm or less, which is the lower bound of the visible spectrum given as 380≤λ≤780 nm. This is the smallest geometry in the system and since this spacing between TTEs is opaque to the visible spectrum there is no need for making it any smaller in this application. If the spacing s is larger than 500 nm for example, light with a shorter wavelength than 500 nm passes through and can create interference patterns on the imaging plane, or the lower bound of the brightness control may be compromised when all the TTEs are activated.

The TTE width can be any value larger than 780 nm and basically determines the resolution of the aperture control. To have meaningful and practical aperture control, the TTE width w must be larger than the space s between the TTEs, which can be formulated as, $$w > s, s \leq \lambda_{MIN} \quad (4)$$

As an example, the system shown in FIG. 4A has 5 concentric rings, which means the diameter control can have only 5 discrete values between the smallest to the largest diameter. A larger number of rings gives a better sensitivity of aperture control between the minimum and maximum desired aperture diameters. If the control circuit that applies voltages to the rings is a digital circuit, having a number of rings obeying $2^n$ is an advantage. This leads to the number of rings being 2, 4, 8, 16, 32, 64, 128, 256, 512, etc. The larger the number, the higher the resolution of aperture control.

If an aperture control in the 1 mm-100 mm range is desired for an expansive photography lens system, using the powers of 2 number of rings rule yields 256 equally spaced and equal width rings of roughly 390μ. This value becomes smaller than the minimum width of 780 nm that was set earlier and is a good example of an overkill design. Having 128 or even 64 equally spaced rings, or using unequal widths in the concentric rings gives a more practical aperture control.

One shortcoming of placing an LCD in front of the camera system is the loss of light intensity that it brings to the optics. The transparency of a regular LCD is in the order of 15%, which is a relatively low number. If greater transparency is needed, then the LCD display can be replaced with the commonly known "high transparency LCD" which can increase the transparency to 45% range.

There is no need to limit the solid-state variable aperture described herein to only pinhole camera applications, as it can be extended to any camera systems. In a "professional" camera there are controls for adjusting the light intensity coming to the film or CCD/CMOS imager, as well as controls for focus and shutter speed, which are done either automatically or manually. The light intensity control is done through control of the aperture diameter. Aperture diameter can also control the depth of view, which adds "art" or "photographers touch" to the photograph, and so is a highly desirable feature in professional photography. However, conventional aperture diameter control in a camera requires highly sophisticated fine mechanics, which are too large to fit in a smartphone. Smartphones today have an image quality, number of pixels, and speed of operation very close to professional cameras, but they always lack the aperture control feature due to the need for mechanical aperture components that cannot fit in smartphone thicknesses in the 5 mm range.

The solid-state variable aperture device has a diameter control capability in the range from the full diameter of a lens to micron sized pinhole diameters, in the increments of microns if desired. This is a capability which cannot be achieved by any mechanical aperture control system today. In addition, the use of LCD technology permits very fast aperture control, on the order of 0.01-0.1 seconds, which is not achievable by mechanical aperture controls in use today. The system uses a very small amount of electrical power and has no moving parts, which is an advantage compared to bulky mechanical aperture control systems.

Diffraction Grating

Figure 6A:
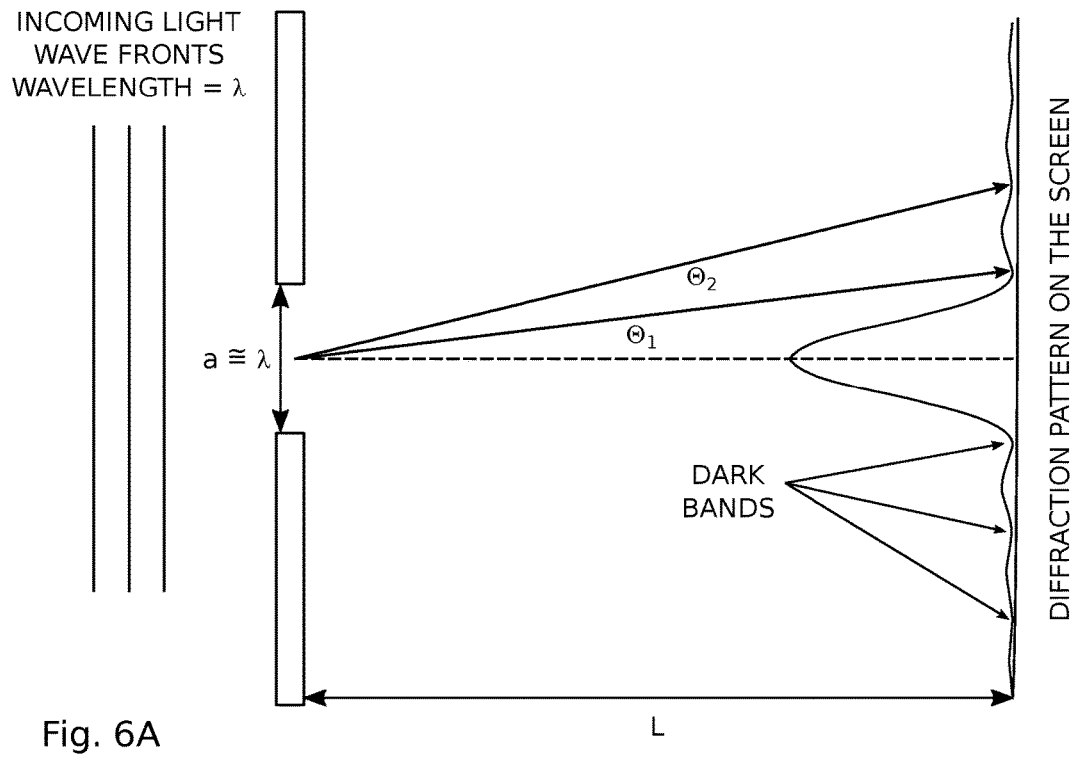
FIGS. 6A and 6B depict diffraction patterns resulting, respectively, from a single and double slit gratings.
Figure 6B:
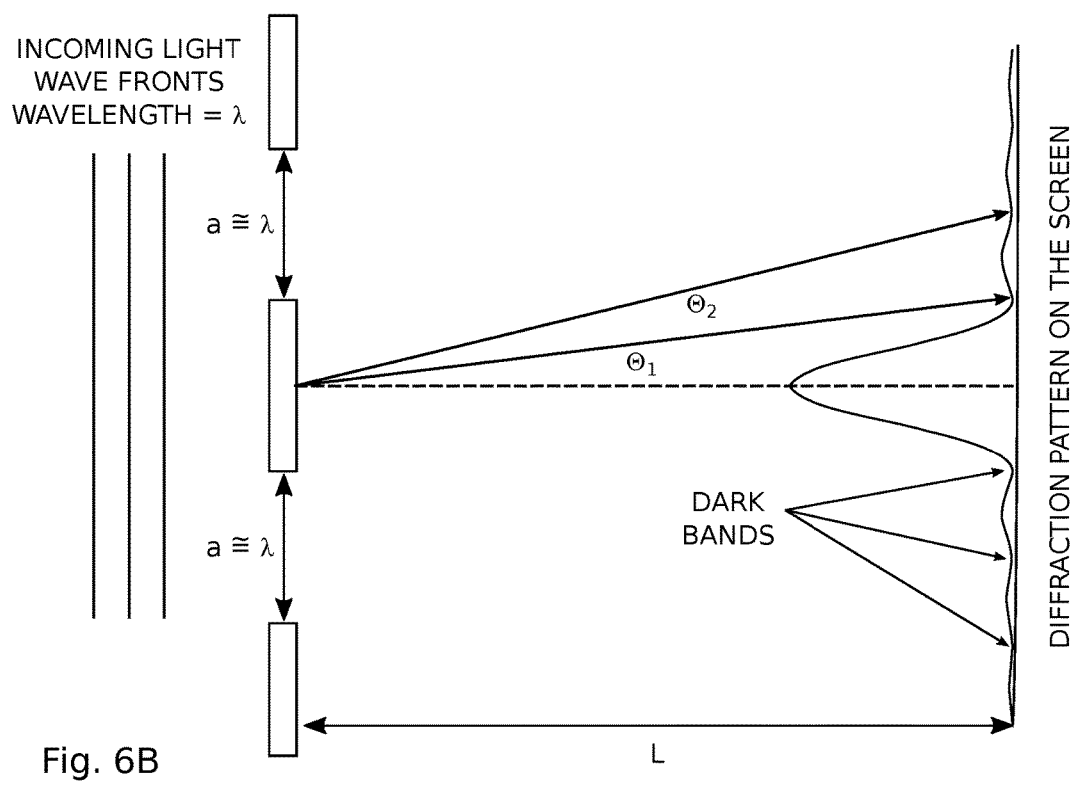

FIGS. 6A and 6B depict diffraction patterns resulting, respectively, from a single and double slit gratings. LCD technology brings the capability of electronically controllable transparency in pixel or any desired geometry form. Light passing through a slit, and later through a grating pattern, was one of the first ways of proving the wave character of light, which is one of the fun high school physics experiments. If the light goes through a hole with a diameter on the order of its wavelength λ, it creates a diffraction pattern on a properly placed image plane which has minimums and maximums arranged in concentric circles as shown in FIG. 6A. By measuring the distances between the maximums or minimums and using the hole diameter, the wavelength of the light can be calculated. In the diffraction pattern formed on the screen, the center high intensity region is called the Airy disc and has an important significance in optics.

Similar diffraction patterns can be generated by the double slit structure as shown in FIG. 6B. One can increase the resolution of the diffraction pattern by making a periodic structure having non-transparent occlusions and transparent slits known as "grating" structure. If light passes through this periodic grating, the diffraction pattern formed on the image plane a distance away from the grating will be clearer than the pattern formed by single and double slit structures. Since the wavelength calculations are based on measuring the distances between maximums and minimums in the diffraction pattern, a periodic grating is a big improvement in the accuracy of these measurements. The mathematical formulation of double slit and grating is the same, and therefore it is a highly preferred diffraction structure in spectroscopy.

Diffraction pattern technique has many uses in physics from simple wave length calculations, to any type of spectroscopy like X-Ray spectroscopy to study crystal structures, to Infra-Red spectroscopy, chromatography to analyze chemical composition of an unknown substance in pharmacology, criminology, and chemistry. Any spectral analysis requires the power spectrum analysis of an electromagnetic radiation. In other words, the power intensity as function of wavelength is needed in any given spectrum of interest. Therefore, accurate wavelength measurement is a must.

Instead of drawing non-transparent lines on a transparent substrate in a periodic manner, as is conventional, the solid-state diffraction grating presented herein uses an LCD structure to generate an electronically configurable grating structure, where the period of the grating can be changed on the fly.

Figure 7A:
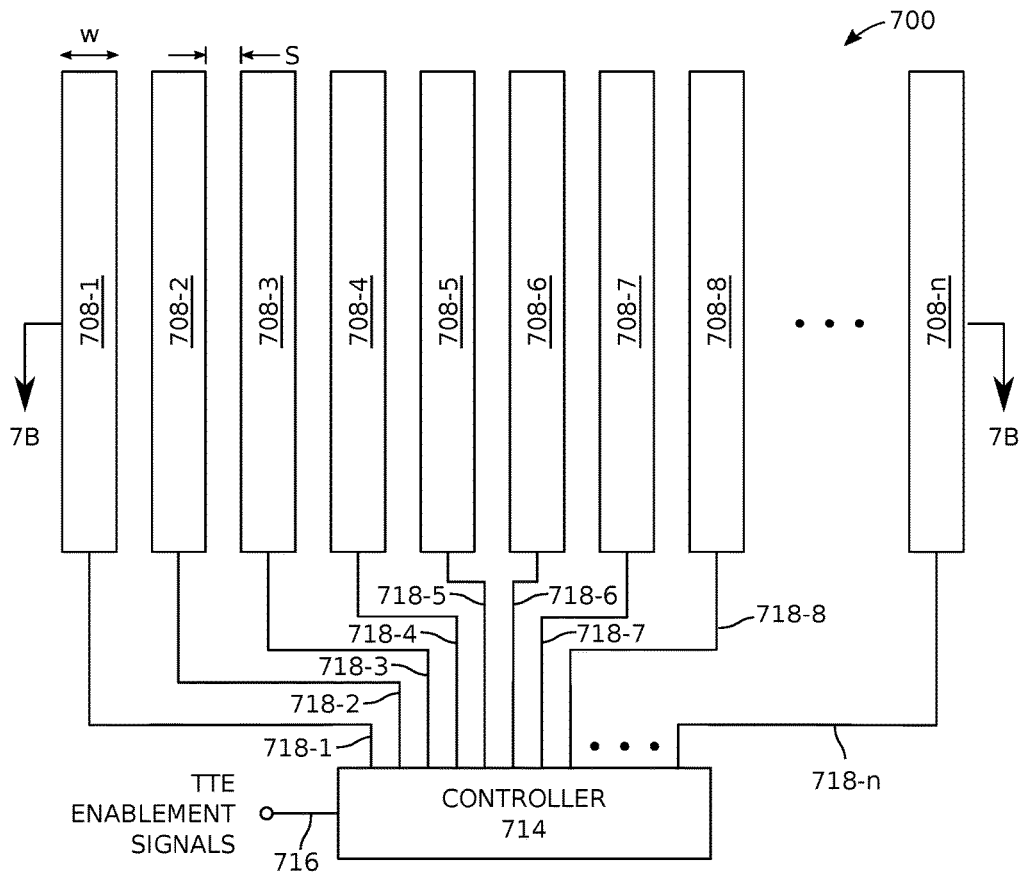
FIGS. 7A and 7B are, respectively, plan and partial cross-sectional views of a solid-state variable diffraction grating.
Figure 7B:
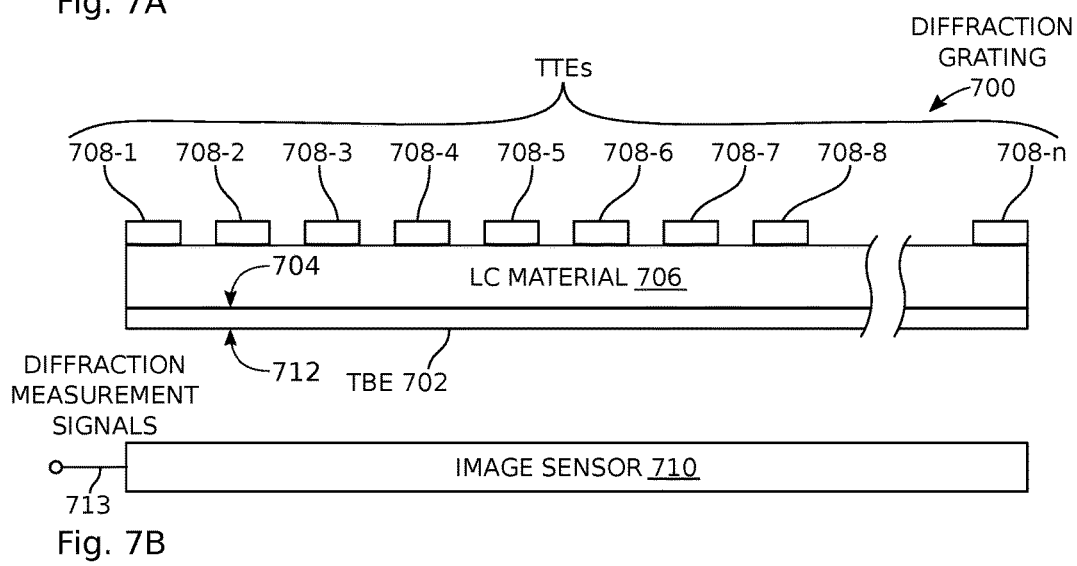

FIGS. 7A and 7B are, respectively, plan and partial cross-sectional views of a solid-state variable diffraction grating. The diffraction grating 700 comprises a transparent conducting bottom electrode (TBE) 702 with a front surface 704. A layer of liquid crystal (LC) material 706 overlies the TBE front surface 704. A field of selectively engageable serially aligned transparent top electrodes (TTEs) 708-1 through 708-n, where n is an integer greater than one, is formed overlying the LC layer. As is the case with the above-described aperture device, interposing LC material 706 becomes optically transparent in response to a voltage differential applied between selected TTEs and the TBE 702. In the presented examples, all the TTEs have the same width (w), but in other aspects different TTE widths may be mingled to improve the grating resolution. In applications involving visible light, the TTEs have a width (w) greater than about 380 nm. As is the case with the aperture, the spacings (s) between TTEs is much smaller than width w.

In one aspect, an image sensor 710 underlies the back surface 712 of the TBE 702. Typically, the image sensor is a charge-couple device (CCD) or complementary metal-oxide-semiconductor (CMOS) device. However, the diffraction system is not limited to any particular type of image sensor. As explained in more detail below, the image sensor is for the purpose of measuring light intensity minima and maxima. The image sensor 710 has an output on line 713 to supply diffraction measurement signals indicative of incident light minima and maxima on the image sensor, as described in greater detail in the explanation of FIGS. 10A through 12B. In another aspect, a controller 714 having an input on line 716 to accept TTE enablement signals and outputs on lines 718-1 through 718-n, respectively connected to TTEs 708-1 through 708-n, to selectively enable TTEs in response to the enablement signals. In some aspects not explicitly shown, one or more polarizer layers may be used, such as shown in FIG. 2. In other aspect not explicitly shown, the controller may be connected to selectively apply voltages changes to the TBE, as described in the explanation of FIG. 5.

In the typical form of the diffraction grating 700, the TTEs are aligned as parallel lines. However, in other aspects, the TTEs may be formed as concentric rings. The aperture device shown in FIGS. 3a and 3B would support such a function in the form of a single slit, or by creating a periodic pattern of transparent and occluded regions.

Figure 8A:
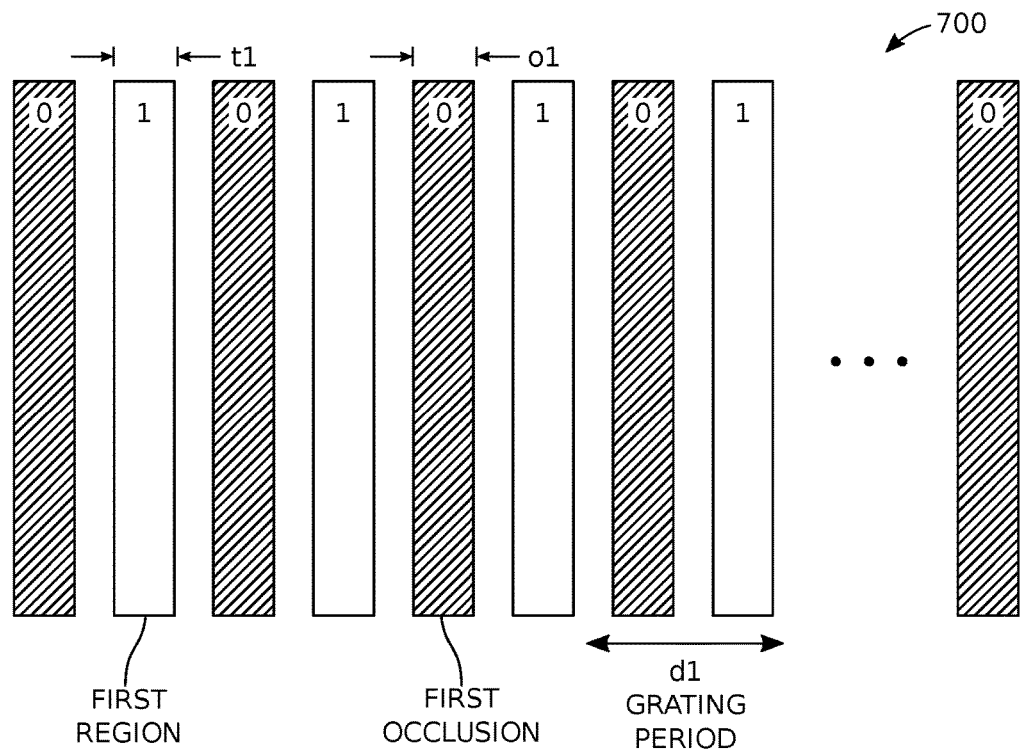
FIGS. 8A through 8D are plan views graphically depicting how the LCD electronic transparent grating is performed by applying different sets of voltages to the TTEs to change the period of the grating.

FIGS. 8A through 8D are plan views graphically depicting how the LCD electronic transparent grating is performed by applying different sets of voltages to the TTEs to change the period of the grating. With reference to FIGS. 7A and 7B, the application of the voltage differential to a first set of TTEs, e.g., TTEs 708-2, 708-4, 708-6, and 708-8, creates an optically transparent first periodic grating d1 in the LC material (FIG. 8A). The application of the voltage differential, represented by the numeral 1, to the first set of TTEs creates a first field of periodically aligned optically transparent regions having a width (t1) and periodically aligned occlusions having a width (o1) between adjacent transparent regions. In this example, the width of a single TTE (w) is equal to both the transparent region width t1 and the occlusion width o1.

Figure 8B:
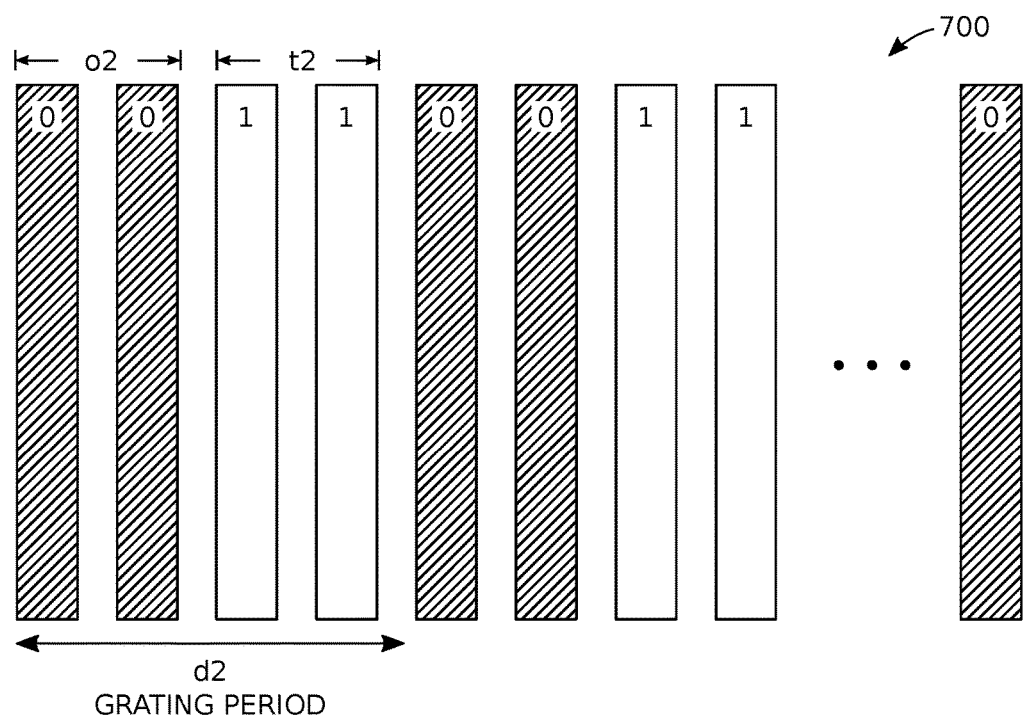
Figure 8C:
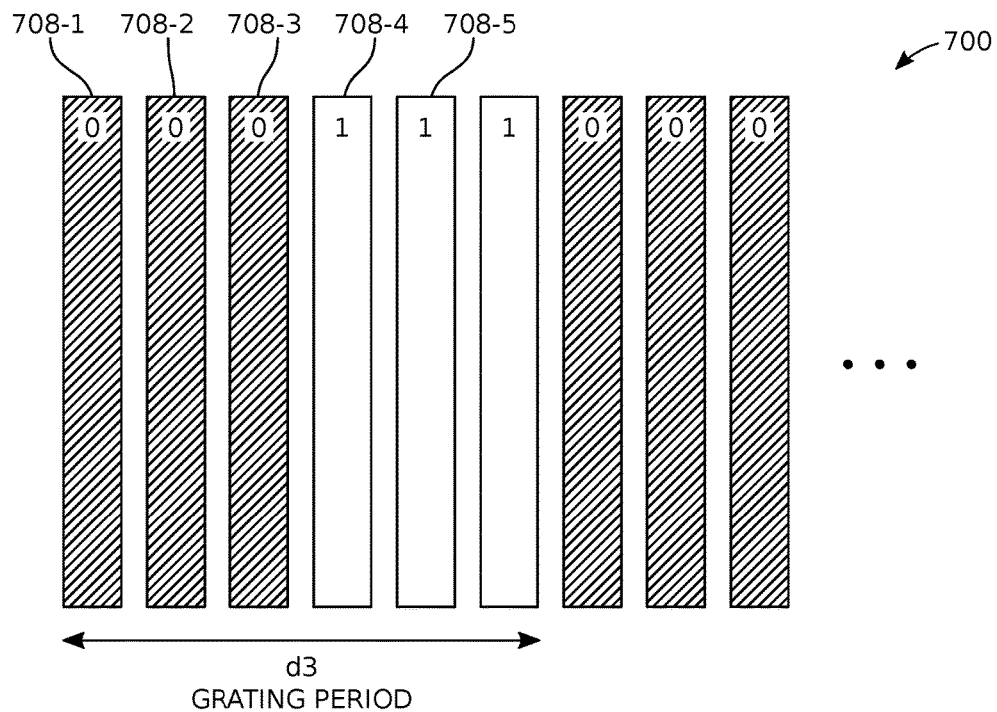

In another example, the voltage differential is applied to a second set of TTEs, e.g., 708-3, 708-4, 708-7, and 708-8, and creates an optically transparent second periodic grating d2 in the LC material (FIG. 8B). That is, the application of the voltage differential to a second set of TTEs creates a second field of periodically aligned optically transparent regions having a width (t2), different than the t1 width, and periodically aligned occlusions having a width (o2) between adjacent transparent regions, different than occlusion width o1. Similarly, FIG. 8C shows a third set of TTEs creating a third field of periodically aligned optically transparent regions having a grating period of d3.

Figure 8D:
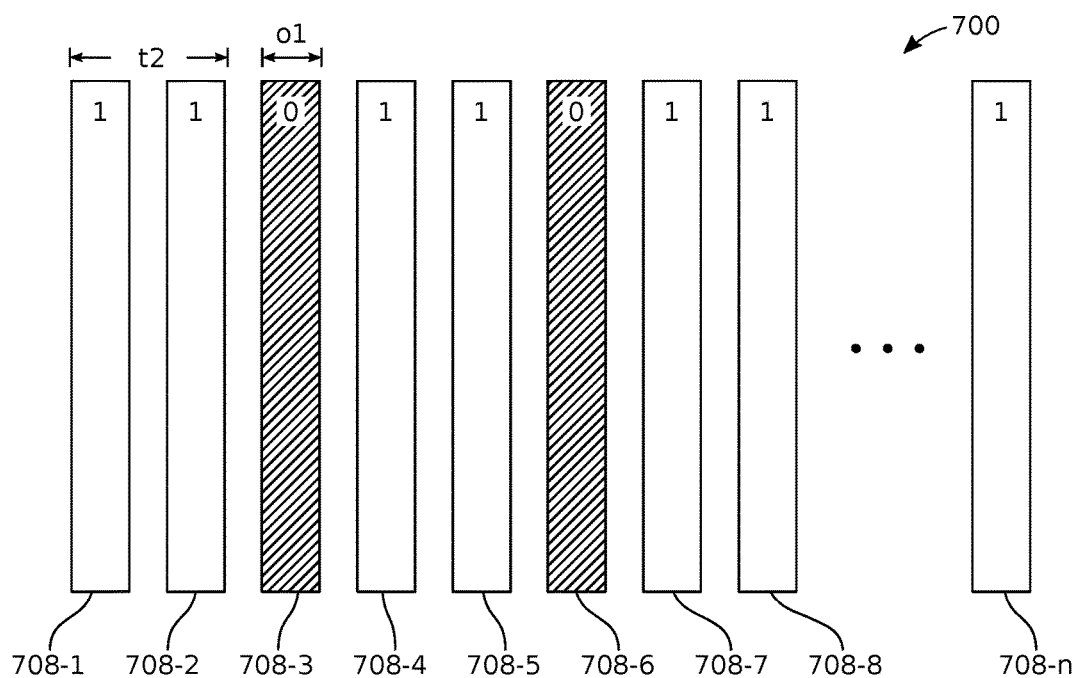

In another variation, as shown in FIG. 8D, the application of the voltage differential to a fourth set of TTEs, e.g., 708-1, 708-2, 708-4, 708-5, 708-7, and 708-8, creates a fourth field of periodically aligned optically transparent regions of the width (t2), and periodically aligned occlusions having the width o1. In a typical grating the width of occlusions are equal in width to the regions of transparency, but the solid-state diffraction grating permits different relationships between transparency widths and occlusion widths. In fact, the grating can be made with more than one transparency width, more than one occlusion width, or combinations of different transparency and occlusion widths. Although not explicitly shown, the length of the TTEs, and therefore the length of the transparent and occluded regions may also be controlled and varied to create periodic patterns.

Figure 10A:
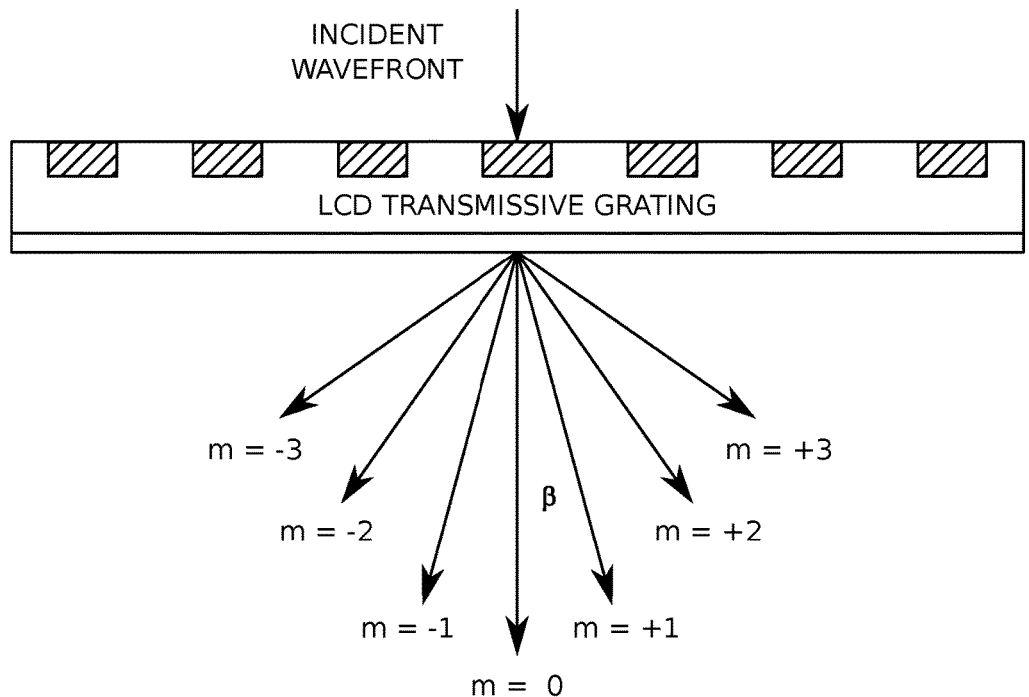
FIGS. 10A and 10B depict a transmissive LCD diffraction grating having a normal incidence ($\alpha=0$) monochromatic light illuminating it.

The change in the period of the grating changes the θ angle where the destructive interference occurs, as shown in FIG. 6A and FIG. 6B. An observer, e.g., image sensor 710, sees the light beam split into its wavelength components at different angles as shown in FIG. 10A, just like the rainbow formation in a prism when illuminated by sun light. In a diffraction grating there can also be several modes of splitting direction for the same wavelength, which does not happen in refractive optical phenomena, such as seen in a prism. In a prism, the reason for light splitting into its components is due to the wavelength dependence of the refractive index, which is a completely different physical phenomena as compared to diffraction. In diffraction gratings, smaller wavelengths of light are diffracted more, whereas in a prism it is opposite, the shorter wavelengths are refracted less. A transparent grating may be seen as a "super prism" with many orders of ray splitting.

The refractive index as a function is inversely proportional to the wavelength. The earliest refraction index formula as a function of wavelength is given by Cauchy in 1836. It is an empirical formula with three parameters and is given as, $$n(\lambda) = A + \frac{B}{\lambda^2} + \frac{c}{\lambda^4} \tag{5}$$

More accurately, the well-known and widely used empirical Sellmeier equation, published by Wolfgang Sellmeier in 1871 is given as, $$n(\lambda) = \sqrt{1 + \sum_{1}^{m} A_i \frac{\lambda^2}{\lambda^2 - \lambda_i^2}} \tag{6}$$

Where n, m, $A_i$, $\lambda_i$ and $\lambda$ is refractive index, Sellmeier order of approximation, like 1, 2, 3 . . . , Sellmeier coefficients, Sellmeier wavelengths, and wavelength. Typically, the suppliers of glass or fiber provide a three term Sellmeier formula (m=3) with 6 parameters that characterizes the refractive index of their products as a function over a wide interval of wavelengths.

Figure 8E:
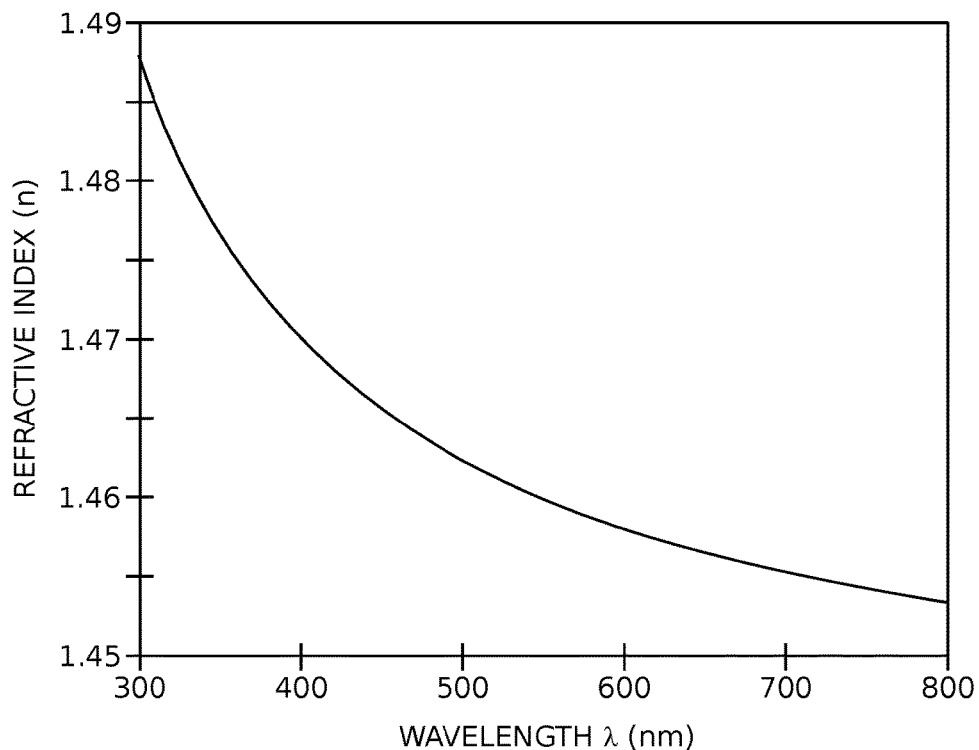
FIGS. 8E through 8G are graphs depicting the relationship between refractive index and wavelength.
Figure 8F:
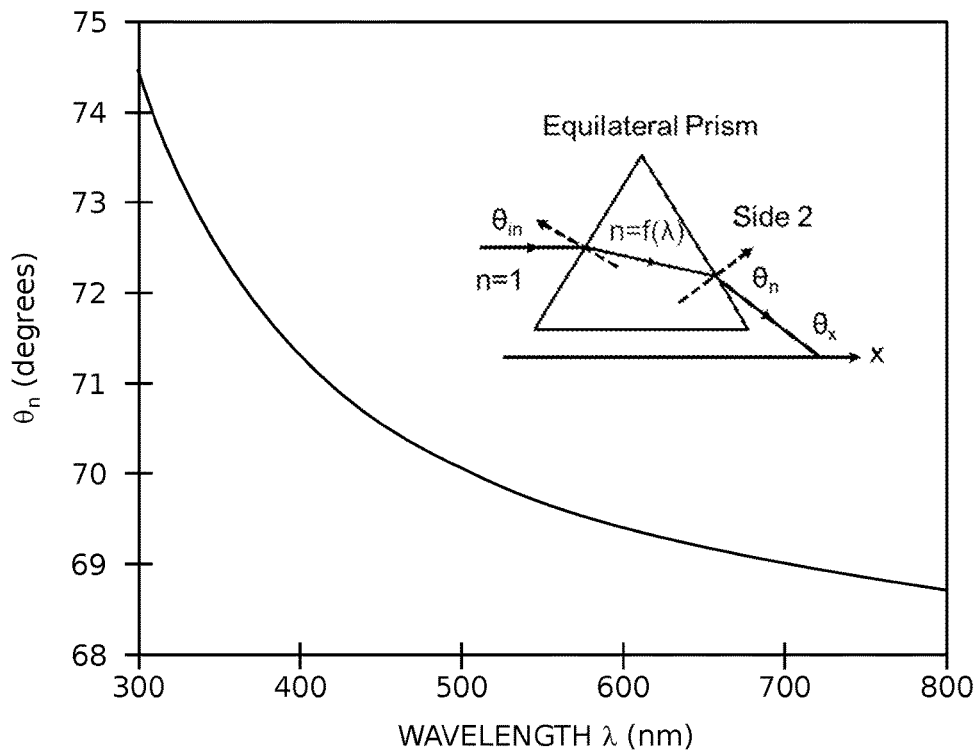
Figure 8G:
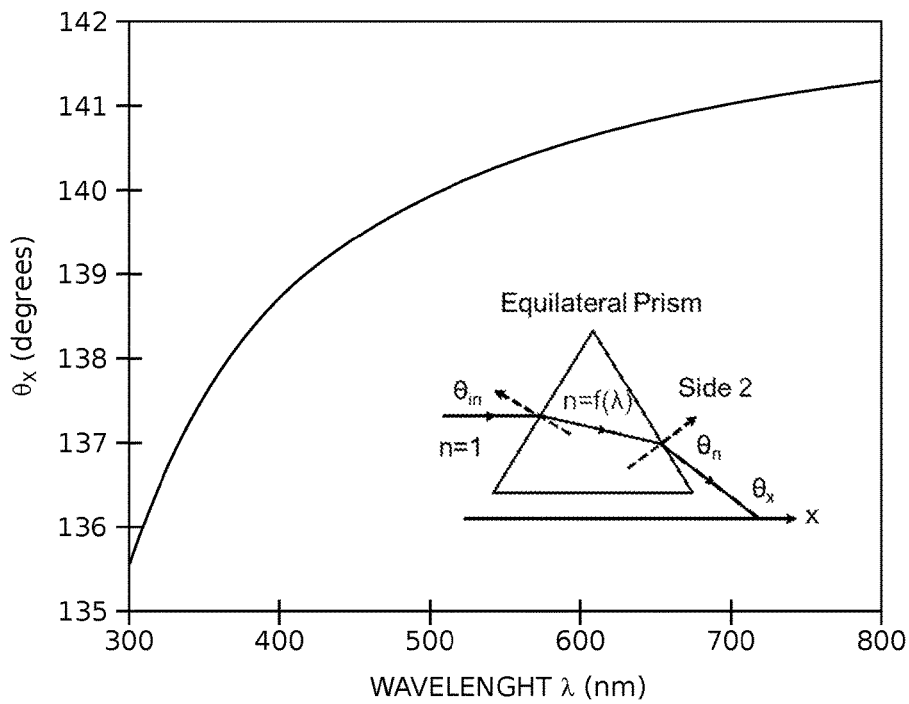

FIGS. 8E through 8G are graphs depicting the relationship between refractive index and wavelength. FIG. 8E shows the refractive index of pure fused silica glass as a function of wavelength with 6 parameter Sellmeier coefficients given as [A]=[0.6961663, 0.4079426, 0.8974794] and [$\lambda_i$]=[0.068404, 0.1162414, 9.896161]. As can be seen, the refractive index is inversely proportional with wavelength as given by (6). FIG. 8F shows the calculated exit angle $\theta_n$, with respect to the normal of Side 2 of an equilateral triangle prism with an incident ray coming parallel to the x axes. Outside of the prism an air medium is assumed with a refractive index of 1. As can be seen, the longer wavelengths bend less, which displays a completely opposite behavior as compared to the diffractive results shown in FIG. 11A and FIG. 12A, described below. FIG. 8G depicts the calculated exit angle $\theta_x$, with respect to x axes in the positive direction (anti-clockwise direction) as a function of wavelength. As can be seen, the variation of exit angles as a function of wavelength is much less than what can be obtained by a diffractive grating, which may be referred to as a "super prism".

The easiest way of formulating the diffraction phenomena in general is by the single slit experiment. Assume that there is a gap a that is on the order of the wavelength of a mono chromatic light that is subject to the experiment. The diffraction pattern seen on the screen has periodic dark and lit patterns due to the wave nature of the light first observed by Huygens in 1678. In 1807 Thomas Young published the double slit experiment. Later the diffraction theory was extended by Augustine Jean Fresnel in 1818 in which he explained many diffraction experiments such as the Arago spot, which is also known as the Poisson spot or Fresnel Bright spot. The Kirchhoff diffraction formula provides a rigorous mathematical foundation for any diffraction experiments based on Maxwell's wave equation. G. I., Taylor, Fraunhofer, Airy, and Lord Raleigh were among other famous scientists which dealt with diffraction phenomena. Although the theory of diffraction is simple and can be explained by constructive and destructive interference, it can lead to complicated mathematical formulation for quantifying general cases. The intensity minima on the screen shown in FIGS. 6A and 6B occurs if the path length difference is an integer number of wavelengths, $$a \, \text{Sin}(\theta) = m\lambda \tag{7}$$

Where m, $\lambda$, a, $\theta$ are the order of each minimum, wavelength, distance between slits or gap in a single slit, and the angle at which destructive interference occurs, known as deviation angle as shown in FIG. 6A and FIG. 6B. The intensity can be given as, $$I = I_0 \frac{\text{Sin}^2\left(\frac{N\theta}{2}\right)}{\left(\frac{\delta}{2}\right)^2} \tag{8}$$

Where $\delta$ is the total phase angle, which is related to the deviation angle $\theta$ as, $$\delta = \frac{2\pi a \text{Sin}(\theta)}{\lambda} \tag{9}$$

Figure 9A:
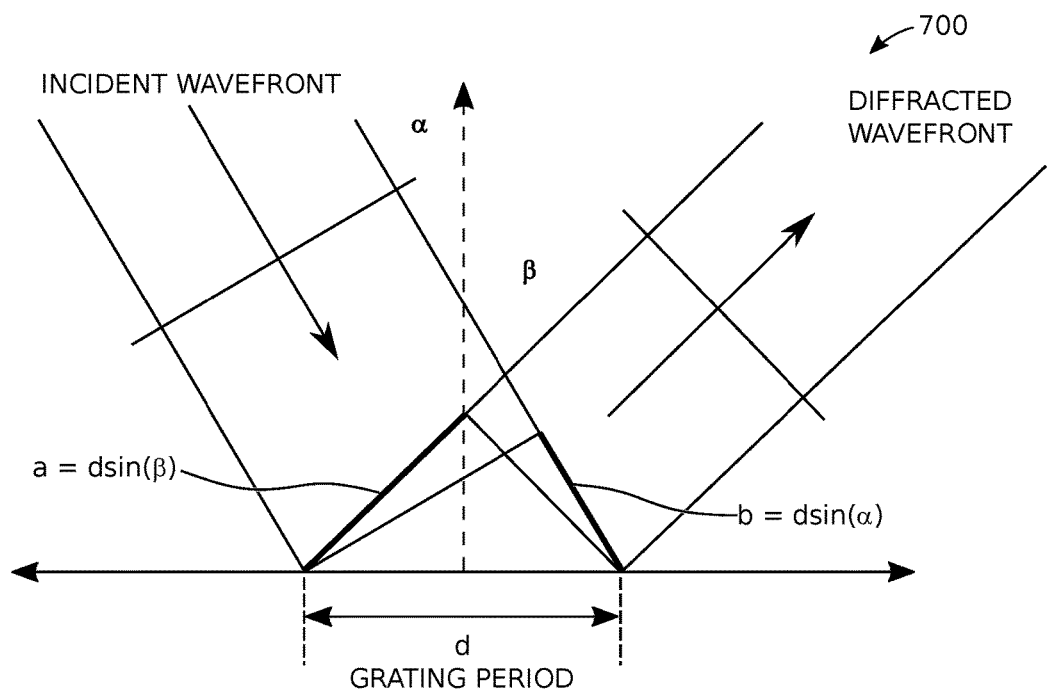
FIGS. 9A and 9B are partial cross-sectional views depicting, respectively, reflective and transmissive gratings.
Figure 9B:
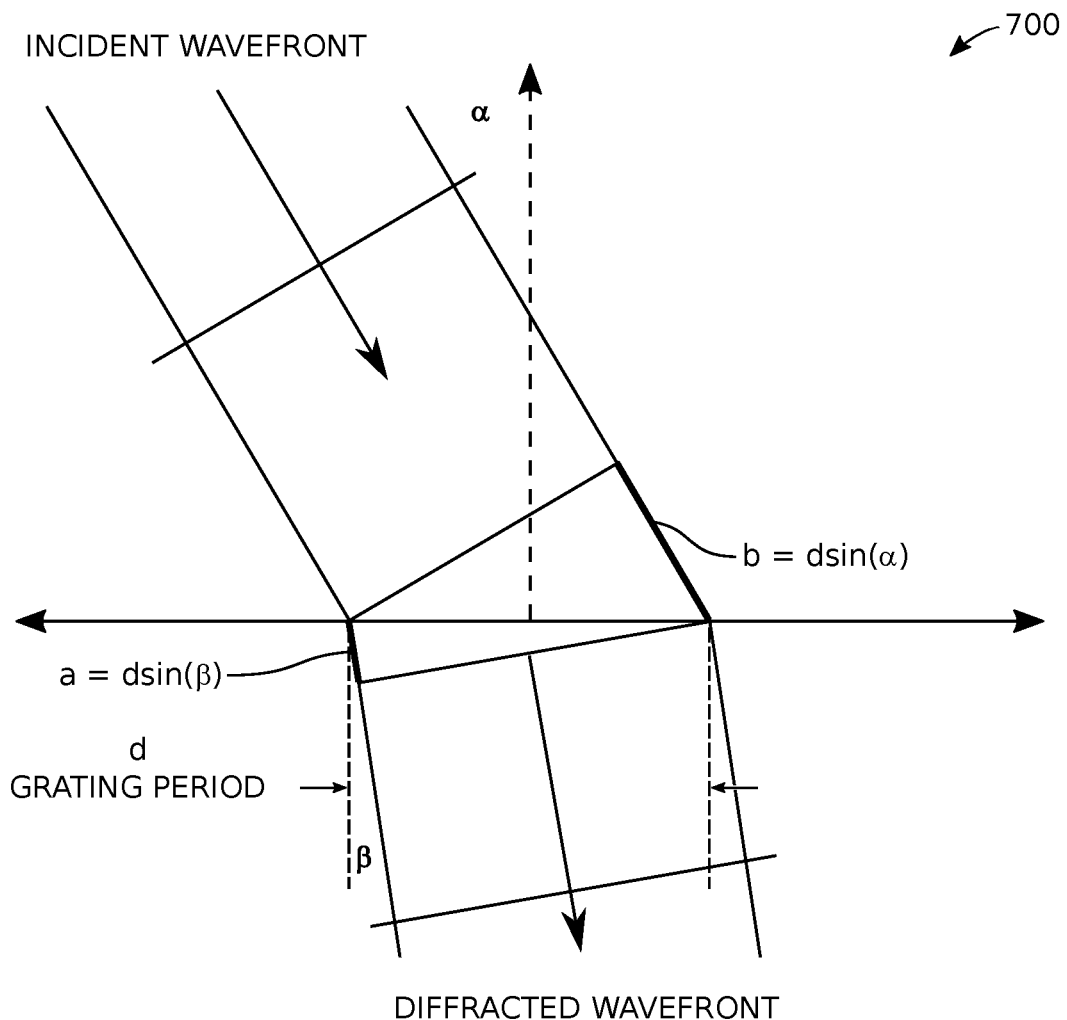

FIGS. 9A and 9B are partial cross-sectional views depicting, respectively, reflective and transmissive gratings. As mentioned above, a diffraction grating is an optical component having a periodic structure that can split and diffract light to several beams traveling in different directions. The phase shift $\phi$ due to the path differences of the rays shown in FIG. 9A and FIG. 9B can be calculated as, $$\phi = \frac{2\pi d}{\lambda}[\text{Sin}(\beta) - \text{Sin}(\alpha)] \tag{10}$$

Using relation (10) for the grating structure shown in FIG. 9A and FIG. 9B, the light of a given wavelength interferes constructively if, $$d[\text{Sin}(\alpha) + \text{Sin}(\beta)] = m\lambda \tag{11}$$

Where m is integer and d is the period of the grating shown in FIGS. 9A and 9B. For normal incidence, $\alpha = 0$ and (8) simplifies to, $$d \, \text{Sin}(\beta) = m\lambda \tag{12}$$

Solving $\lambda$ from (11) gives, $$\lambda(\beta) = \frac{d \text{Sin}(\beta)}{m} \tag{13}$$

A given direction transmits a variety of wavelengths related by integral fractional multiples, and a given wavelength can appear in many directions. As can be seen in (13) and all the formulations given, the period of the grating d, determines the diffraction pattern. In the solid-state diffraction grating, the slit or the grating geometry is controlled by LCD technology, which is electronically controllable and adjustable for spectroscopy and beam steering applications.

Figure 10B:
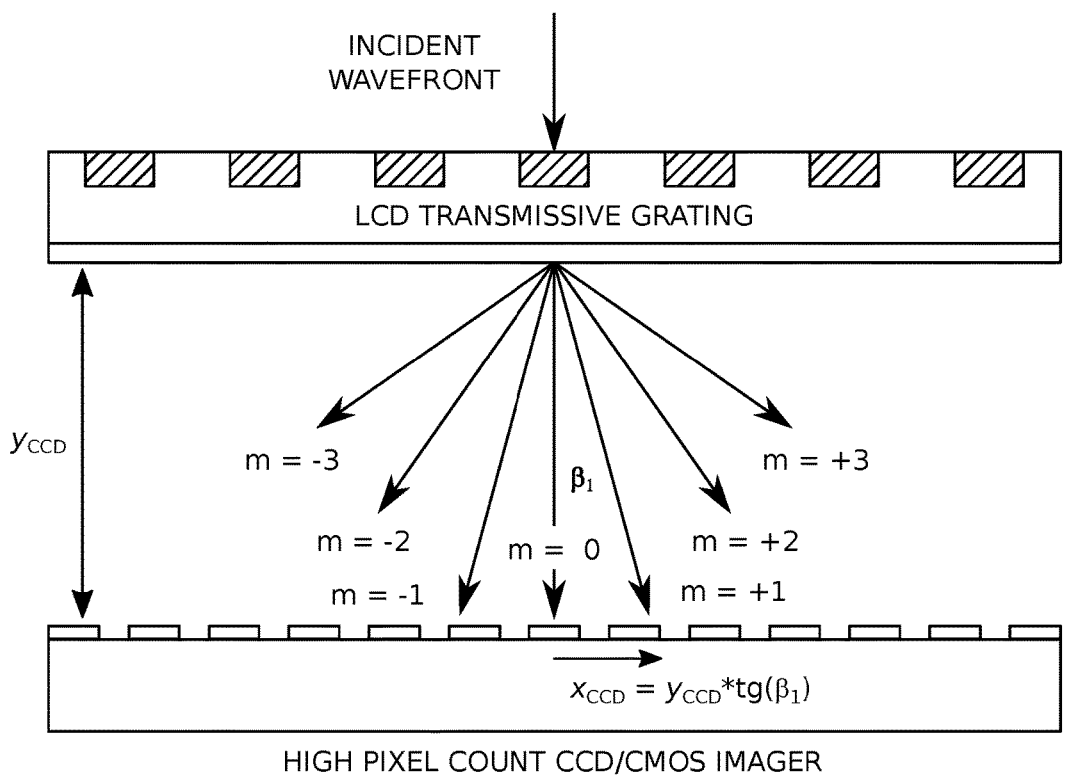

FIGS. 10A and 10B depict a transmissive LCD diffraction grating having a normal incidence ($\alpha=0$) monochromatic light illuminating it. The transmitted light splits into different number of directions corresponding to different orders of m=−3, −2, −1, 0, 1, 2, 3. If the incoming light is a spectrum of light there will be a spectrum of rainbows of colors in each direction, as seen observing the reflected light from any CD, flat panel TV, or a smartphone display that has a periodic light reflecting grid structure under the cover glass.

FIG. 10B shows how measurements on an image plane can be captured using a CCD or CMOS imager acting as the electronic image plane or image sensor. The CCD/CMOS imager has pixels with a given size, such as 3 by 3 microns, which are also spaced a fixed distance away from each other in x and y direction, covering a given sensing area. Each pixel light intensity and color can be electronically accessed by selecting a row and column address. As can be seen, the CCD/CMOS itself is a two-dimensional periodic optical intensity sensing device with a given number of bits of resolution, which is typically 8-12 bits equivalent to 256-4096 levels. Since the pixel size and spacing is known, and the structure is a two-dimensional periodic structure, it is straightforward to calculate x,y coordinates in microns on the CCD/CMOS sensor from a given row and column address for an arbitrary set reference point. If the CCD/CMOS sensor is aligned with the transparent diffraction grating structure as shown in FIG. 10B, it can be used to measure the distances between the maximums and minimums and the intensity pattern of any diffraction pattern.

For a d diffraction grating value set in the LCD transparent diffractive element, the ß angle is calculated by solving (12) for different integer m values. Since the distance between the LCD transparent diffraction grating and the CCD/CMOS $y_{CCD}$ is known, the diffraction pattern maximums and minimums x coordinates can be calculated, thus performing spectral analysis of an electromagnetic radiation shining on the transmissive diffraction grating. The opposite approach is the actual way of performing a spectral analysis using the solid-state diffraction grating described herein. The CCD/CMOS imager captures the diffraction intensity pattern of the light spectrum shining on the LCD transparent diffractive element. In other words, the diffraction intensity pattern $y_{CCD}=f(x)$ is known and its angle function (13) can be calculated by simple trigonometry applied to FIG. 10B for a maximum point on the diffraction pattern as, $$x_{CCD} = y_{CCD} \cdot tg(\beta_1) \quad (14)$$

Solving $\beta_1$ which corresponds to m=+1 or m=−1 gives, $$\beta_1 = tg^{-1}\left(\frac{x_{CCD}}{y_{CCD}}\right) \quad (15)$$

Solving the wavelength λ by substituting $\beta_1$ in (12) gives, $$\lambda = d\, \text{Sin}(\beta_1) \quad (16)$$

Since d is the grating period and it is known, the wavelength corresponding to that maximum on the CCD or CMOS imager can be calculated. In other words; the known periodic structure of the CCD/CMOS imager is used as an "electronic ruler" with a 0.8-3 micron resolution to measure the light intensity versus x on the image plane. Dividing the x value to the known distance between the CCD/CMOS surface and diffraction grating and getting its inverse tangent as in relation (15) gives the ß angle, which gives the wavelength corresponding to the intensity with the relation (16). Since any high-resolution CCD/CMOS imager has pixels exactly a known distance apart, the resolution of $x_{CCD}$ is very small and precise, resulting in very precise spectrum analysis.

Imager technology is rapidly changing to increase the pixel count and for enhancement at low level lighting conditions, especially for the smartphone market. At the time of this writing a typical 16Mega Pixel smartphone camera may have 5312×2988 pixels with a 1.2×1.2µ and a 12-bit Red-Green-Blue (RGB) resolution. A 13Mega Pixel CMOS camera may have 4224×3136 pixels, with pixel sizes of 1.2×1.2µ, and a 10 bit RGB resolution, with a 30 frame per second rate of image transfer rate. Other CMOS imagers have 23.4 Mega Pixels with pixel sizes of 1.12×1.12µ.

Figure 11A:
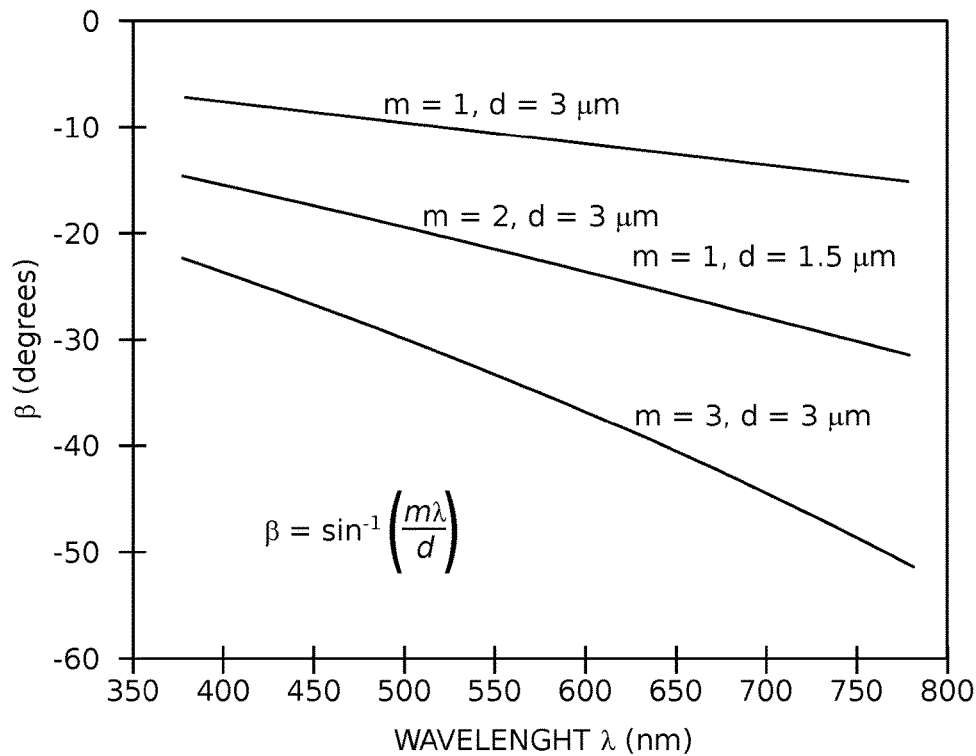
FIG. 11A shows the $\beta$ diffraction angle as a function of A in the visible spectrum of $380 \leq \lambda \leq 780$ nm for two different transparent gratings having width/spacing values of 1,500 and 3,000 nm.

FIG. 11A shows the ß diffraction angle as a function of λ in the visible spectrum of 380≤λ≤780 nm for two different transparent gratings having width/spacing values of 1,500 and 3,000 nm. Solving (12) for 8 diffraction angle gives, $$\beta = \text{Sin}^{-1}\left(\frac{m\lambda}{d}\right) \quad (17)$$

The solution of (17) for m≠0 is possible if, $$\frac{\lambda}{d} \leq 1 \quad (18)$$

In other words, any m value giving λ/d value larger than 1 is not possible. 1,500 nm width/spacing gives grating orders m=−1, 0, +1 as the possible 8 solutions of (12). On the other hand, 3,000 nm width/spacing gives m=−3, −2, −1, 0, 1, 2, 3 as the possible 8 solutions of (12). FIG. 11A only shows the (17) plots for m=−1, −2 and −3 for 3,000 nm width/spacing grating and the only one possible case m=−1 for 1,500 nm width/spacing. Since d=3,000 nm is an integer multiple of 1,500, the m=−2 plot is identical to m=−1 plot for d=1,500 nm.

Figure 11B:
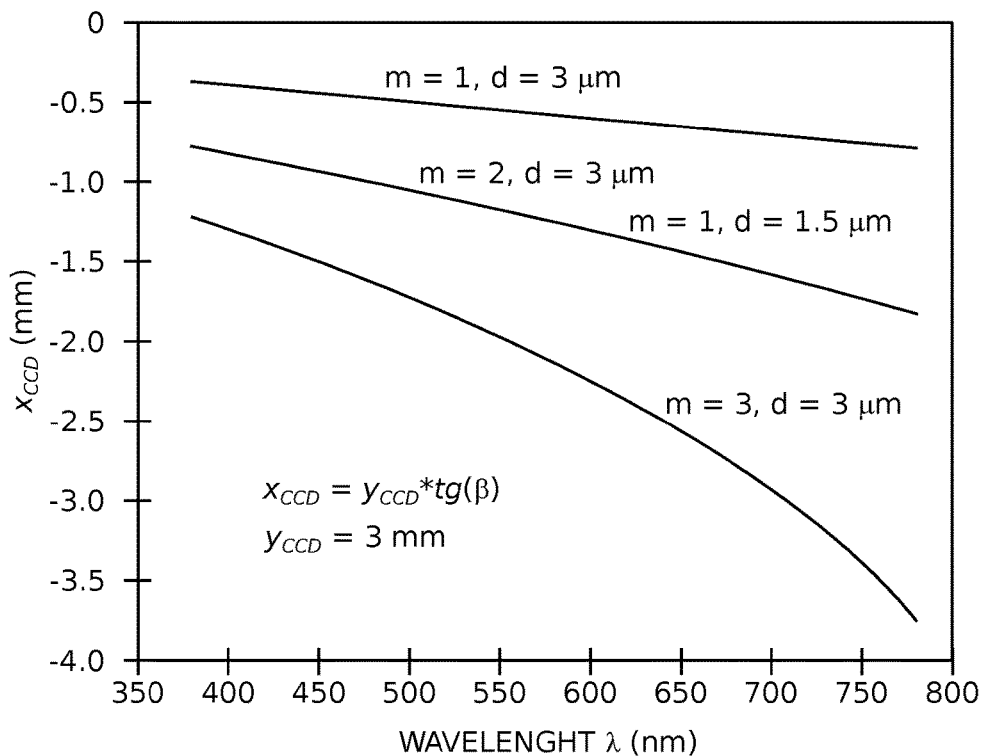
FIG. 11B shows the diffraction pattern $x_{CCD}$ as given in (14) on a CCD imager.

FIG. 11B shows the diffraction pattern $x_{CCD}$ as given in (14) on a CCD/CMOS imager. The imager is placed $y_{CCD}=3$ mm away from the same two grating structures as a function of the same wavelength variation given in FIG. 11A. Having a 3 mm distance between the grating and the CCD/CMOS imager results in a very thin spectroscopy device, even thin enough to fit in a smartphone.

Figure 12A:
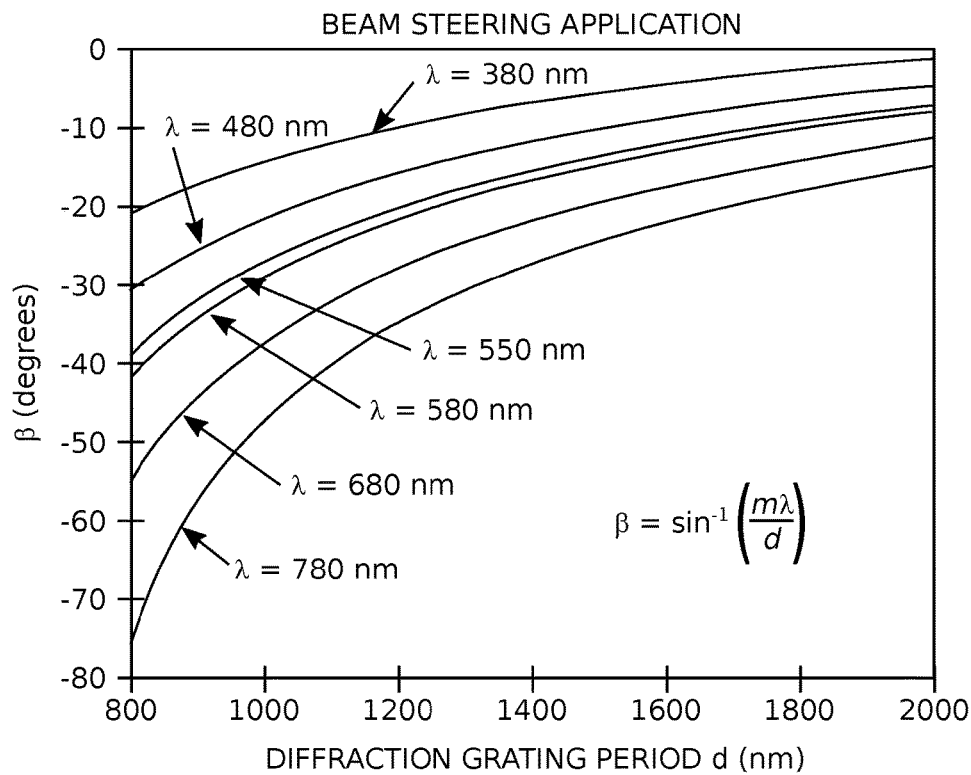
FIG. 12A and FIG. 12B are graphs demonstrating the static beam steering property of the LCD grating structure for 6 wavelengths in the visible spectrum.
Figure 12B:
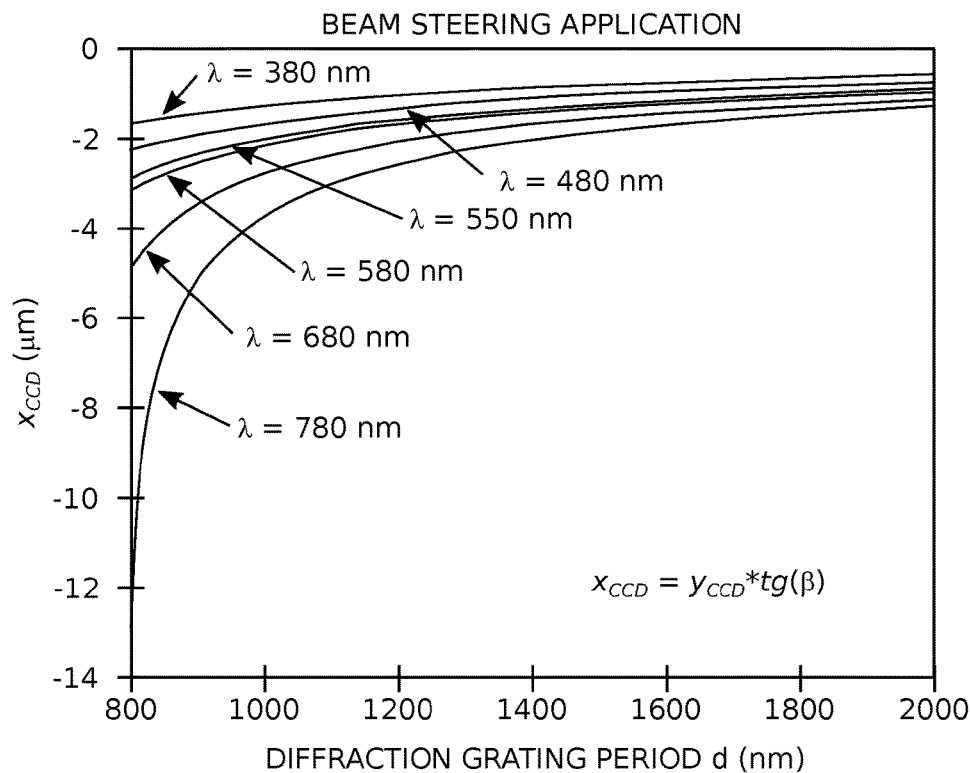

FIG. 12A and FIG. 12B are graphs demonstrating the static beam steering property of the LCD grating structure for 6 wavelengths in the visible spectrum. FIG. 12A shows the ß angle as given by the relation (17) for only the m=1 mode, for 6 selected visible wavelengths of 380, 480, 555, 580, 680, and 780 nm. The LCD grating d value that is the width/space of the grating is electrically varied from 800-2,000 nm and the monochromatic beams are steering angles plotted in FIG. 12A. As can be seen, 30-80 degrees of beam steering is demonstrated with no moving parts with very fast response times on the order of 10-100 ms, depending on the type of liquid crystal used.

FIG. 12B shows the corresponding $x_{CCD}$ vs d function on the CCD/CMOS imager placed, again, 3 mm away from the transmissive LCD grating.

Figure 13:
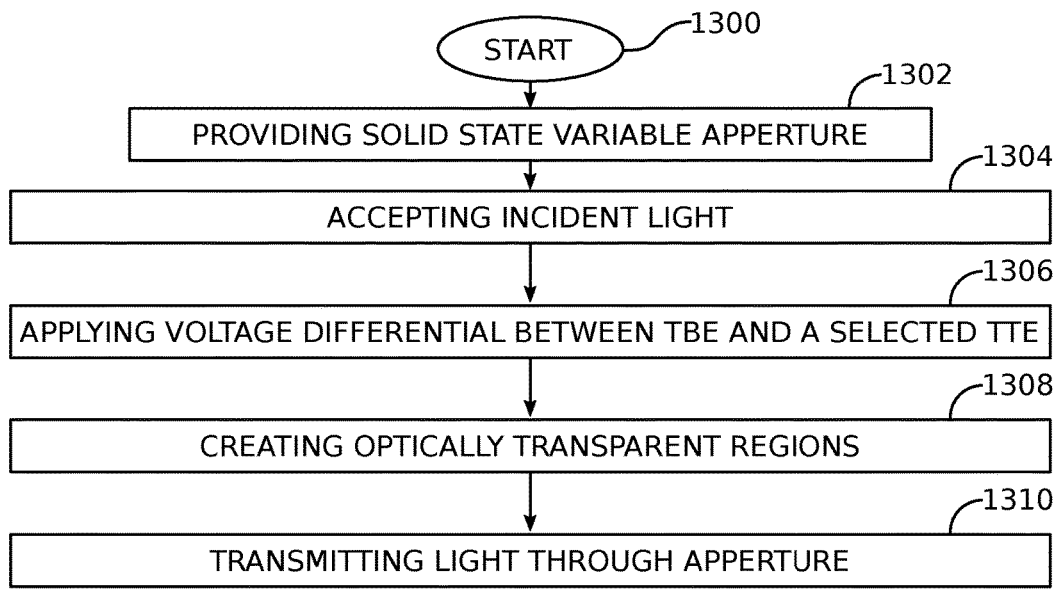
FIG. 13 is a flowchart illustrating a method for varying the size of an optical aperture.

FIG. 13 is a flowchart illustrating a method for varying the size of an optical aperture. Although the method is depicted as a sequence of numbered steps for clarity, the numbering does not necessarily dictate the order of the steps. It should be understood that some of these steps may be performed in parallel, or performed without the requirement of maintaining a strict order of sequence. Generally however, the method follows the numeric order of the depicted steps. The method starts at Step 1300.

Step 1302 provides a solid-state aperture as described in detail above. The aperture comprises a transparent bottom electrode (TBE), a layer of liquid crystal (LC) material overlying the TBE, and a field of selectively engageable transparent top electrodes (TTEs) concentrically aligned around an optically transparent aperture center and formed overlying the LC layer. Step 1304 accepts light incident to the TTEs and Step 1306 applies a voltage differential between a selected TTE and the TBE. Step 1308 creates an optically transparent region in the LC material interposed between the selected TTE and the TBE, and in Step 1310 light is transmitted through the aperture.

With respect to Step 1302, the TTEs are referenced, in a direction outward from the aperture center, as a1 and a2. Referencing FIG. 3A, TTEs a1 and a2 are labeled 304-1 and 304-2, respectively. When Step 1306 applies the voltage differential to TTE a1 at a first time, Step 1308 creates a first optically transparent region in the LC material with a cross-section d1 across the aperture center, see FIG. 4A.

Figure 4B:
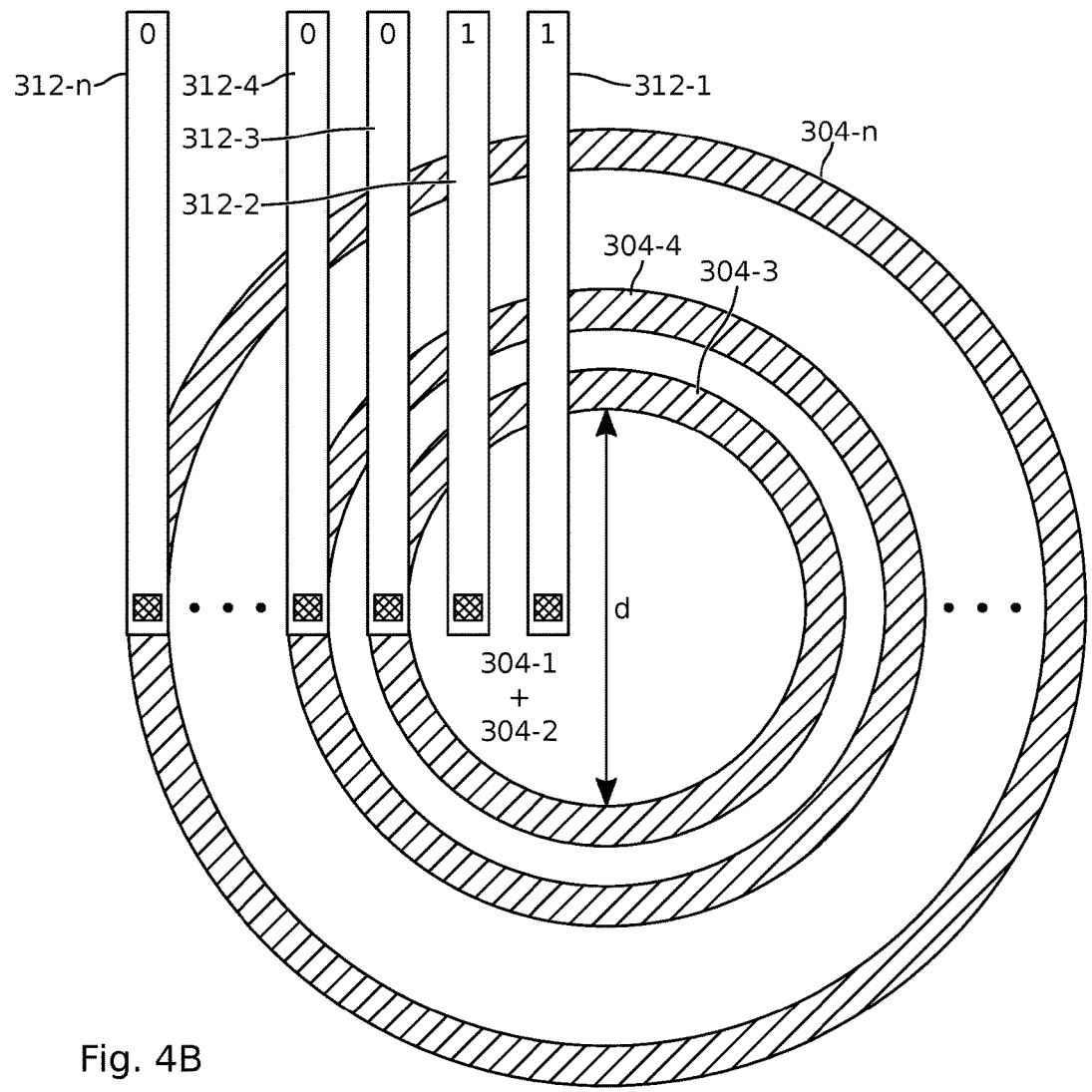
Figure 4C:
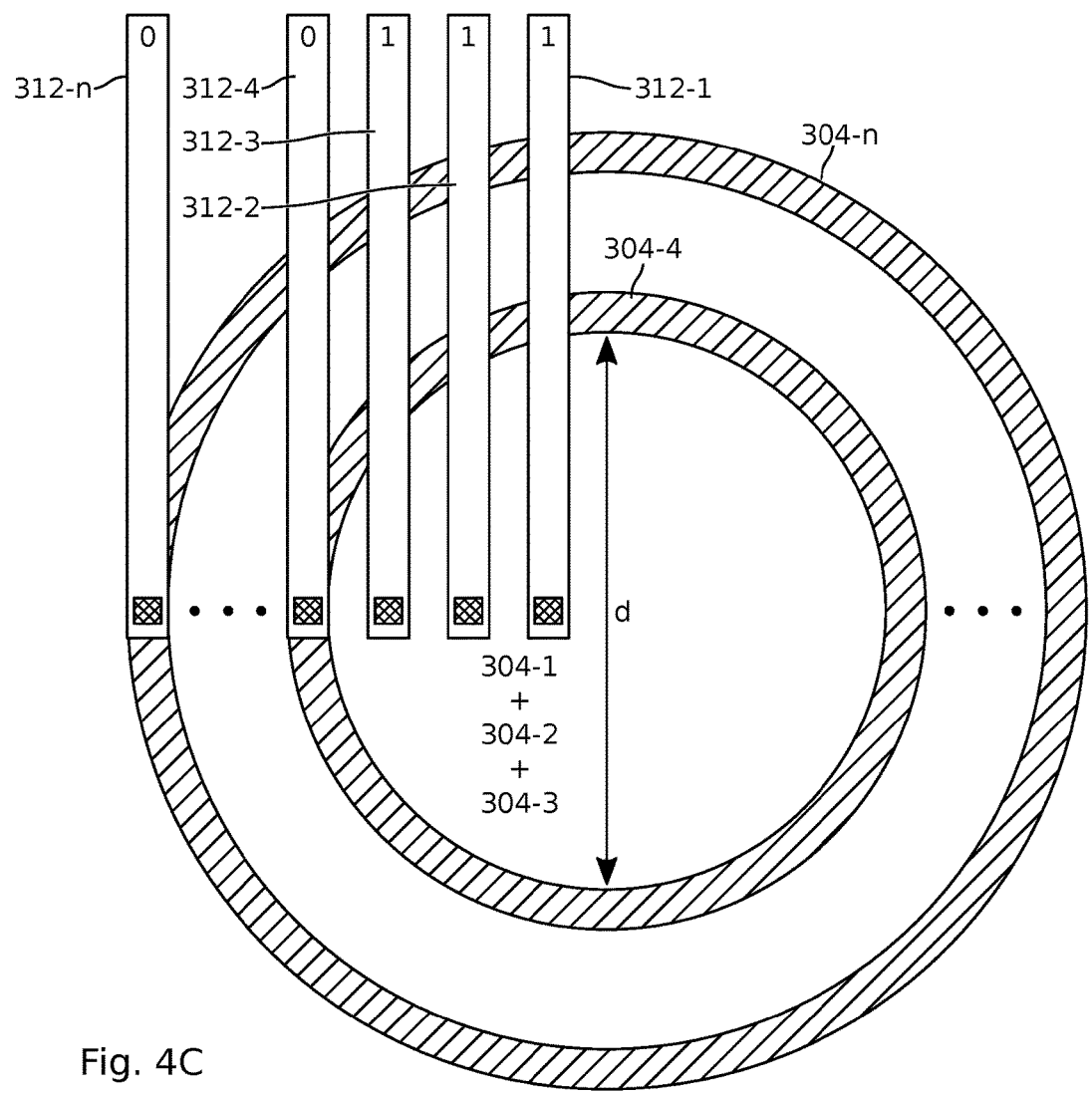
Figure 4D:
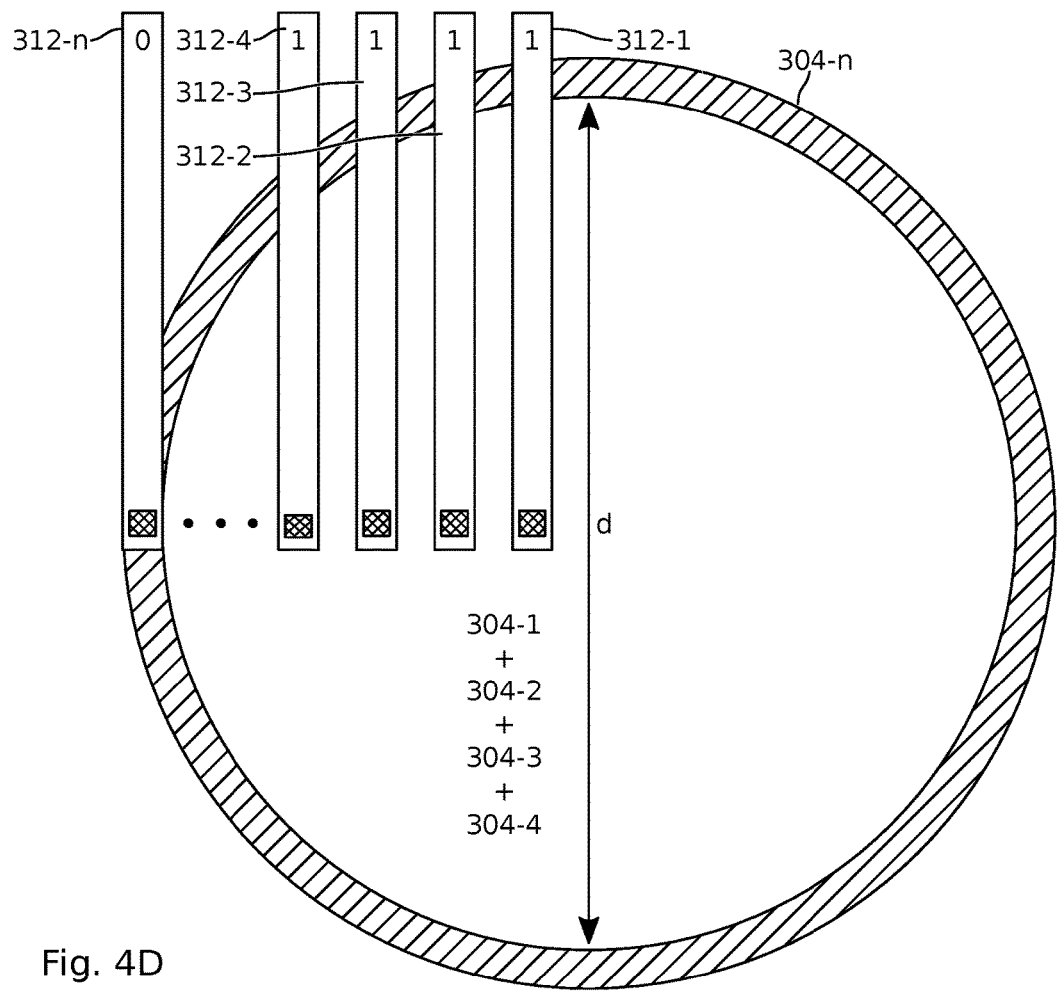

When Step 1306 applies the voltage differential to TTEs a1 and a2 at a second time (subsequent to the first time), Step 1308 creates a second optically transparent region in the LC material with a cross-section d2 across the aperture center, where d2>d1, see FIG. 4B. The second optically transparent region is created within 0.1 seconds, or less, from the second time initiated in Step 1306.

For visible light applications, Step 1302 provides TTEs having a width (w), separated from concentrically adjacent TTEs by a space (s), where w≥about 1000 nanometers (nm) and s is less than about 380 nm. Then, Step 1304 accepts incident light having a wavelength in the range between about 380 and 780 nm.

Figure 14:
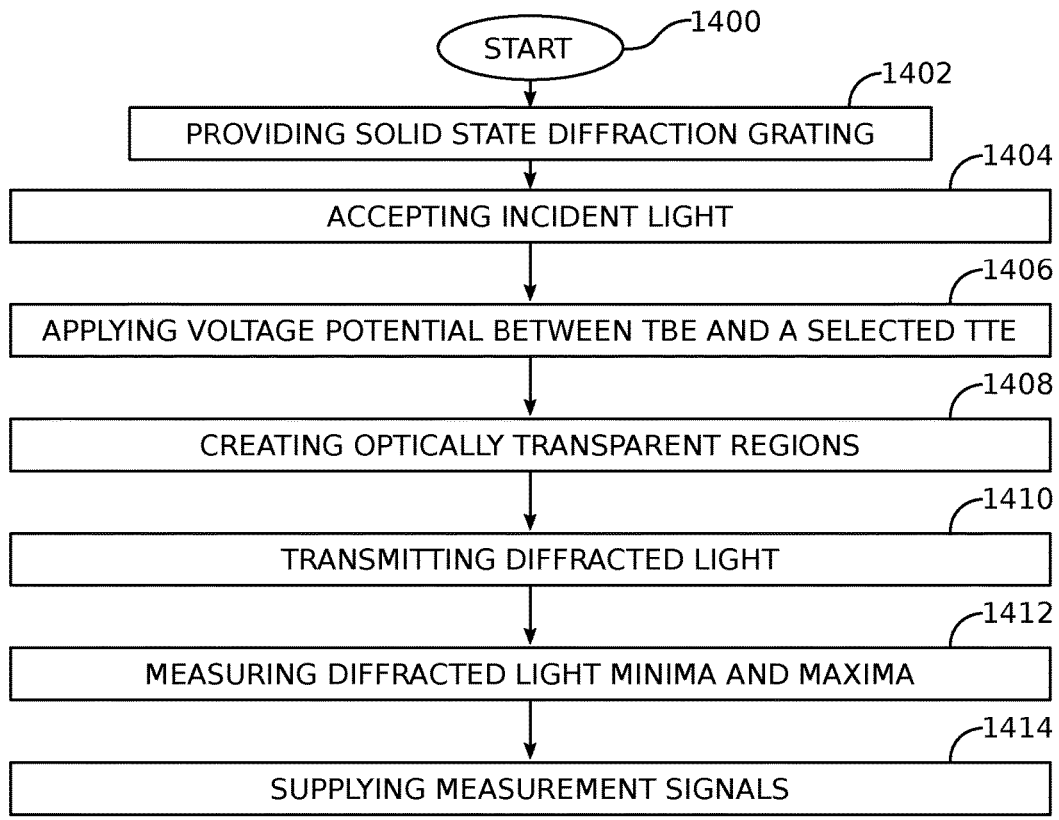
FIG. 14 is a flowchart illustrating a method for variably diffracting light using a solid-state diffraction grating.

FIG. 14 is a flowchart illustrating a method for variable diffracting light using a solid-state diffraction grating. The method begins at Step 1400. Step 1402 provides a solid-state diffraction grating, as described in detail above. The solid-state diffraction grating, see FIGS. 7A and 7B, comprises a transparent conducting bottom electrode (TBE) with a front surface, a layer of liquid crystal (LC) material overlying the TBE front surface, and a field of selectively engageable serially aligned transparent top electrodes (TTEs) formed overlying the LC layer. Step 1404 accepts light incident to the TTEs and Step 1406 applies a voltage differential between a selected TTE and the TBE. Step 1408 creates an optically transparent region in the LC material interposed between the selected TTE and the TBE, and Step 1410 transmits a pattern of diffracted light through the diffraction grating.

In one example, Step 1406 applies the voltage differential to a first set of TTEs (e.g., FIG. 8A) and Step 1410 creates a first diffraction pattern of light. In a second example, Step 1406 applies the voltage differential to a second set of TTEs (e.g., FIG. 8B) and Step 1410 creates a second diffraction pattern of light, different than the first diffraction pattern.

Alternatively stated, when Step 1406 applies the voltage differential to a first set of TTEs at a first time, Step 1408 creates a first field of periodically aligned optically transparent regions having a width (t1) and periodically aligned occlusions with the width (o1) between adjacent transparent regions. Likewise, when Step 1406 applies the voltage differential to a second set of TTEs at a second time (subsequent to the first time), Step 1408 creates a second field of periodically aligned optically transparent regions having a width (t2), different than width t1, and periodically aligned occlusions having a width (o2) between adjacent transparent regions, different than the o1 spacing. In one aspect, Step 1408 creates the second field within 0.1 seconds, or less, from the second time.

In one aspect, Step 1406 applies the voltage differential to a first set of TTEs, and Step 1410 steers a beam of light at a first angle 81, with respect to a first mode. When Step 1406 applies the voltage differential to a second set of TTEs, Step 1410 steers the beam of light at a second angle 82, different than the first angle 81, with respect to the first mode. The beam steering capabilities of the diffraction grating are described in detail in the explanation of FIGS. 12A and 12B.

In one aspect, Step 1412 measures diffracted light minima and maxima on an image sensor and Step 1414 supplies diffracted light measurement signals.

Solid-state variable aperture and diffraction devices have been provided as well as methods for their use. Examples of particular materials and circuit geometries have been presented to illustrate the invention. However, the invention is not limited to merely these examples. Other variations and embodiments of the invention will occur to those skilled in the art.

REFERENCES

1. "Electronic Device and Method for Non-Contact Capacitive and Optical Pin Hole Fingerprint Detection", Osman Ersed Akcasu, U.S. Ser. No. 16/057,677, Aug. 7, 2018.
2. "Lord Rayleigh on Pin hole Photography", John W. Strutt Lord Rayleigh, Philosophical Magazine, Vol. 31, 1891, pp. 87-99.
3. "Pinhole Optics", M. Young, Applied Optics, Vol. 10, pp. 2763-2767.
4. https://en.wikipedia.org/wiki/Pinhole_camera.
5. "Engineering Electromagnetic Fields and Waves," Carl T. A. Johnk, John Willey & Sons, Copyright 1975, ISBN 0-471-44289-5.
6. "Elements of Electromagnetics," Matthew N. O. Sadiku, Oxford University Press, Copyright 2001 Third Edition, 2001, ISBN 0-19-513477-X.
7. "The Feynman Lectures on Physics", Richard P. Feynman, Robert B. Leighton, Matthew L. and Sands, Copyright 1963, 1989 California Institute of Technology, ISBN 0-201-51003-0.
8. "Electronic Display Devices", John Willey & Sons, ISBN 0 471 92218 8
9. "Finger Print Sensing Techniques", Hsu Wen-Hsing, Sep. 7, 2007, www.ee.nthu.edu.tw/whhsu/96up/01%20Fingerprint%20sensing%20techniques.ppt
10. https://info.photomodeler.com/blog/kb/what_is_camera_focal_length/
11. https://petapixel.com/2017/06/16/smartphone-cameras-improved-time/
12. https://www.androidauthority.com/smartphone-camera-guide-sony-samsung-623791/

I claim:

1. A solid-state variable aperture comprising:
   a transparent bottom electrode (TBE);
   a layer of liquid crystal (LC) material overlying the TBE;
   a field of selectively employable transparent top electrodes (TTEs) concentrically aligned around an optically transparent aperture center and formed overlying the LC layer; and
   wherein regions of the LC material underlying unemployed TTEs are optically occlusive.

2. The aperture of claim 1 wherein the LC material between a selected TTE and the TBE becomes optically transparent in response to a voltage differential applied between the selected TTE and the TBE.

3. The aperture of claim 2 wherein the TTEs are referenced, in a direction outward from the aperture center, as a1 and a2,
   wherein the application of the voltage differential to TTE a1, in a first state, creates an optically transparent region in the LC material with a cross-section d1 across the aperture center; and,
   wherein the application of the voltage differential to TTEs a1 and a2, in a second state, creates an optically transparent region in the LC material with a cross-section d2 across the aperture center, where d2>d1.

4. The aperture of claim 3 wherein the TTEs have a width (w) and are separated from adjacent TTEs by a space (s), where w≥about 1000 nanometers (nm) and s is less than about 380 nm.

5. The aperture of claim 1 wherein the TTEs have a width (w) and are separated from adjacent TTEs by a space (s), where w≥4s.

6. The aperture of claim 1 further comprising:
   transparent conductive voltage supply traces respectively connected to the TTEs.

7. The aperture of claim 6 further comprising:
a controller having an input to accept TTE enablement signals and outputs connected to the transparent conductive voltage supply traces to independently employ TTEs in response to the enablement signals.

8. The aperture of claim 1 wherein the TTEs are concentrically aligned rings.

9. The aperture of claim 1 wherein the inner-most concentrically aligned TTE includes the aperture center.

10. A solid-state variable diffraction grating comprising:
a transparent conducting bottom electrode (TBE) with a front surface;
a layer of liquid crystal (LC) material overlying the TBE front surface;
a field of selectively employable serially aligned transparent top electrodes (TTEs) formed overlying the LC layer; and,
wherein regions of LC material underlying unemployed TTEs are optically occlusive.

11. The diffraction grating of claim 10 wherein the LC material between a selected TTE and the TBE becomes optically transparent in response to a voltage differential applied between the selected TTE and the TBE.

12. The diffraction grating of claim 10 wherein the application of a voltage differential to a first set of TTEs, in a first state, creates an optically transparent first periodic grating in the LC material; and,
wherein the application of the voltage differential to a second set of TTEs, in a second state, creates an optically transparent second periodic grating in the LC material.

13. The diffraction grating of claim 10 wherein the application of a voltage differential to a first set of TTEs, in a first state, creates a first field of periodically aligned optically transparent regions having a width (t1) and periodically aligned occlusions having a width (o1) between adjacent transparent regions; and,
wherein the application of the voltage differential to a second set of TTEs, in a second state, creates a second field of periodically aligned optically transparent regions having a width (t2), different than t1, and periodically aligned occlusions having a width (o2) between adjacent transparent regions, different than o1.

14. The diffraction grating of claim 10 wherein the application of a voltage differential to a first set of TTEs, in a first state, creates a first field of periodically aligned optically transparent regions having a width (t1) and periodically aligned occlusions having a width (o1) between adjacent transparent regions; and,
wherein the application of the voltage differential to a second set of TTEs, in a second state, creates a third field of periodically aligned optically transparent regions having the width t1 and periodically aligned occlusions having the width (o3) between adjacent transparent regions, different than o1.

15. The diffraction grating of claim 10 wherein the TTEs have a width (w) greater than about 380 nm.

16. The diffraction grating of claim 10 wherein the TTEs are aligned in an arrangement selected from the group consisting of parallel lines and concentric rings.

17. The diffraction grating of claim 10 further comprising:
an image sensor underlying a back surface of the TBE having an output to supply diffraction measurement signals responsive to light minima and maxima incident to the image sensor.

18. The diffraction grating of claim 10 further comprising:
a controller having an input to accept TTE enablement signals and outputs connected to the TTEs to independently employ TTEs in response to the enablement signals.

19. A solid-state variable aperture comprising:
a transparent bottom electrode (TBE);
a layer of liquid crystal (LC) material overlying the TBE;
a field of selectively engageable transparent top electrodes (TTEs) concentrically aligned as circular rings around an optically transparent aperture center, formed overlying the LC layer;
a layer of glass overlying the field of TTEs; and,
transparent conductive voltage supply traces overlying the layer of glass, respectively connected to corresponding TTEs through vias in the layer of glass.

20. The aperture of claim 19 wherein the LC material between a selected TTE and the TBE becomes optically transparent in response to a voltage differential applied between the selected TTE and the TBE.

21. The aperture of claim 20 wherein the TTEs are referenced, in a direction outward from the aperture center, as a1 and a2,
wherein the application of the voltage differential to TTE a1, in a first state, creates an optically transparent region in the LC material with a cross-section d1 across the aperture center; and,
wherein the application of the voltage differential to TTEs a1 and a2, in a second state, creates an optically transparent region in the LC material with a cross-section d2 across the aperture center, where d2>d1.

22. The aperture of claim 21 wherein the TTEs have a width (w) and are separated from adjacent TTEs by a space (s), where w≥about 1000 nanometers (nm) and s is less than about 380 nm.

23. The aperture of claim 19 wherein the TTEs have a width (w) and are separated from adjacent TTEs by a space (s), where w≥4s.

24. The aperture of claim 19 further comprising:
a controller having an input to accept TTE enablement signals and outputs connected to the transparent conductive voltage supply traces to independently enable TTEs in response to the enablement signals.

25. The aperture of claim 19 wherein the TTEs are referenced, in a direction outward from the aperture center, as a1 through an; and,
wherein the conductive voltage supply traces overlying at least TTEs a1 through a(n−1) are formed as parallel straight lines.

26. The aperture of claim 19 wherein the TTEs are referenced, in a direction outward from the aperture center, as a1 through an, and where TTE a1 includes the aperture center.

27. A solid-state variable aperture comprising:
a transparent bottom electrode (TBE);
a layer of liquid crystal (LC) material overlying the TBE;
a field of selectively engageable transparent top electrodes (TTEs) concentrically aligned as circular rings formed around an optically transparent aperture center, overlying the LC layer, where the TTEs are referenced, in a direction outward from the aperture center, as a1 through an; and,
wherein s cross-section of a transparent circular aperture formed in the LC material is responsive to the number of consecutively engaged TTEs including TTE a1.

28. The aperture of claim 27 wherein the application of the voltage differential to TTE a1, in a first state, creates a first aperture in the LC material with a cross-section d1 across the aperture center; and,
   wherein the application of the voltage differential to TTEs a1 and a2, in a second state, creates a second aperture in the LC material with a cross-section d2 across the aperture center, where d2>d1.

29. The aperture of claim 27 wherein TTE a1 includes the aperture center.

30. The aperture of claim 27 further comprising:
a layer of glass overlying the field of TTEs; and,
transparent conductive voltage supply traces overlying the layer of glass, respectively connected to corresponding TTEs through vias in the layer of glass.

* * * * *

UNITED STATES PATENT AND TRADEMARK OFFICE
CERTIFICATE OF CORRECTION

PATENT NO. : 11,054,680 B1
APPLICATION NO. : 16/271804
DATED : July 6, 2021
INVENTOR(S) : Osman Ersed Akcasu Page 1 of 1

It is certified that error appears in the above-identified patent and that said Letters Patent is hereby corrected as shown below:

In the Claims

In Column 20, Line 46, Claim 25, the letter "n" in the term "an" should be in bold face type.

In Column 20, Line 62, Claim 27, the letter "n" in that term "an" should be in bold face type.

In Column 20, Line 63, Claim 27, the phrase "wherein s cross-section...." should be written as "wherein a cross-section...".

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*